(12) United States Patent
Cho et al.

(10) Patent No.: US 11,675,356 B2
(45) Date of Patent: Jun. 13, 2023

(54) METHOD AND SYSTEM FOR PROVIDING CLOTHING MANAGEMENT SERVICE

(71) Applicant: LG ELECTRONICS INC., Seoul (KR)

(72) Inventors: Sungil Cho, Seoul (KR); Inyoung Hwang, Seoul (KR); Kyoungha Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 442 days.

(21) Appl. No.: 17/022,873

(22) Filed: Sep. 16, 2020

(65) Prior Publication Data
US 2021/0208590 A1 Jul. 8, 2021

(30) Foreign Application Priority Data
Jan. 2, 2020 (KR) ........................ 10-2020-0000530

(51) Int. Cl.
| | | |
|---|---|---|
| G05D 1/02 | (2020.01) | |
| G06Q 10/02 | (2012.01) | |
| G06Q 30/018 | (2023.01) | |
| G06Q 20/08 | (2012.01) | |
| G06N 20/00 | (2019.01) | |
| G07C 5/02 | (2006.01) | |
| D06F 34/05 | (2020.01) | |

(Continued)

(52) U.S. Cl.
CPC .......... *G05D 1/0212* (2013.01); *D06F 34/05* (2020.02); *D06F 34/14* (2020.02); *D06F 34/28* (2020.02); *G01C 21/206* (2013.01); *G06N 20/00* (2019.01); *G06Q 10/02* (2013.01); *G06Q 20/085* (2013.01); *G06Q 30/0185* (2013.01); *G07C 5/02* (2013.01); *D06F 2101/14* (2020.02); *D06F 2105/44* (2020.02); *D06F 2105/56* (2020.02); *D06F 2105/58* (2020.02); *G05D 2201/0203* (2013.01); *G06Q 2240/00* (2013.01); *G06V 40/1365* (2022.01); *G06V 40/172* (2022.01); *G06V 40/197* (2022.01); *G10L 17/06* (2013.01)

(58) Field of Classification Search
CPC combination set(s) only.
See application file for complete search history.

(56) References Cited

U.S. PATENT DOCUMENTS

| | | | |
|---|---|---|---|
| 10,628,785 B2 * | 4/2020 | Lee ........................ | G06Q 10/04 |
| 2014/0052660 A1 * | 2/2014 | Lee ........................ | G06Q 10/04 |
| | | | 705/338 |

(Continued)

*Primary Examiner* — Peter D Nolan
*Assistant Examiner* — Mikko Okechukwu Obioha
(74) *Attorney, Agent, or Firm* — Fish & Richardson P.C.

(57) ABSTRACT

A method for controlling a vehicle that has a cleaning device. The method includes: receiving, from a terminal, reservation information for a cleaning operation performed by the cleaning device located in the vehicle; transmitting, based on the received reservation information, one or more first operation commands that control the vehicle to move to a location associated with the received reservation information and enables the cleaning device located in the vehicle to perform the cleaning operation; receiving, from the vehicle and based on completion of the cleaning operation performed by the cleaning device located in the vehicle, a completion message; and handling control of the vehicle and the cleaning device located in the vehicle based on the received completion message.

28 Claims, 27 Drawing Sheets

(51) Int. Cl.

| | | |
|---|---|---|
| *D06F 34/28* | (2020.01) | |
| *D06F 34/14* | (2020.01) | |
| *G01C 21/20* | (2006.01) | |
| *D06F 105/44* | (2020.01) | |
| *G10L 17/06* | (2013.01) | |
| *D06F 105/58* | (2020.01) | |
| *D06F 105/56* | (2020.01) | |
| *D06F 101/14* | (2020.01) | |
| *G06V 40/16* | (2022.01) | |
| *G06V 40/18* | (2022.01) | |
| *G06V 40/12* | (2022.01) | |

(56) References Cited

U.S. PATENT DOCUMENTS

| | | | |
|---|---|---|---|
| 2017/0098191 A1* | 4/2017 | Lee | G06Q 10/06311 |
| 2019/0188761 A1* | 6/2019 | Dheedene | G06Q 50/30 |
| 2021/0254269 A1* | 8/2021 | Fujii | G01C 21/3438 |

* cited by examiner

First user (First terminal)
   Departure point: Place A / Arrival point: Place B
   Estimated time: about 35 minutes (1.00 pm ~ 1.35 pm)
   -> First course recommendation Second user (Second terminal)
   Departure point: Place C / Arrival point: Place D
   Estimated time: about 15 minutes (1.45 pm ~ 2.00 pm)
   -> Second course recommendation First user (First terminal)
   Clothing: Coat / Material: Cotton /
   Estimated time: about 35 minutes ->
   Third course recommendation Second user (Second terminal)
   Clothing: Jacket / Material: Leather /
   Estimated time: about 15 minutes ->
   Fourth course recommendation Menu entry (a)

(b)

METHOD AND SYSTEM FOR PROVIDING CLOTHING MANAGEMENT SERVICE

CROSS-REFERENCE TO RELATED APPLICATION

This application is based on and claims priority under 35 U.S.C. 119 to Korean Patent Application No. 10-2020-0000530, filed on Jan. 2, 2020, the contents of which are all hereby incorporated by reference herein in their entirety.

BACKGROUND OF THE INVENTION

Field of the Invention

The present disclosure relates to a method and system for providing clothing management service.

Description of the Related Art

Vehicles can be classified into an internal combustion engine vehicle, an external composition engine vehicle, a gas turbine vehicle, an electric vehicle, etc. according to types of motors used therefor.

Users using autonomous vehicles require various services. In particular, users who work outside and board the vehicle want to manage clothing for the time until the next destination.

In particular, in the case of a shared vehicle including an autonomous driving system, there is a need for a method and a system that allow a large number of users to be provided with clothing management services conveniently.

SUMMARY OF THE INVENTION

An object of the present disclosure is to provide clothing management service in a shared vehicle in which a vehicle clothing management device is installed.

In addition, an object of the present disclosure is to provide a recommended course based on reservation information received from a user as a recommended course for the vehicle clothing management device.

In addition, an object of the present disclosure is to provide clothing management service through identification of passengers and persons who make reservations in the shared vehicle used by a large number of users.

Technical objects to be achieved by the present disclosure are not limited to the aforementioned technical objects, and other technical objects not described above may be evidently understood by a person having ordinary skill in the art to which the present disclosure pertains from the following description.

In order to solve the above problems, the present disclosure, in a method for providing clothing management service using a clothing management device provided in a shared vehicle, may include receiving reservation information for the clothing management service from a terminal, transmitting a first operation command for an operation of the clothing management device to the shared vehicle based on the reservation information, and receiving a completion message that the operation of the clothing management device according to the first operation command is completed from the shared vehicle.

In addition, the receiving reservation information may include receiving basic information for providing the service from the terminal, transmitting a recommended course generated based on the basic information to the terminal, and receiving selection information for selecting the recommended course from the terminal.

In addition, the basic information may include a destination of the shared vehicle.

At this time, the recommended course may be generated based on an estimated time to reach the destination of the shared vehicle.

In addition, the basic information may include identification information of a person who reserves the service.

At this time, the method for providing clothing management service may include receiving passenger recognition information from the shared vehicle, and transmitting matching information matching the passenger to the person who reserves the service to the shared vehicle based on the passenger recognition information.

The passenger recognition information may include identification information of the passenger, and the matching information may include information of the same person as a result of matching the identification information of the passenger to the identification information of the person who reserves the service.

In addition, the passenger recognition information may include image data of the passenger obtained through a camera included in the shared vehicle.

In addition, the passenger recognition information may include voice data of the passenger obtained through a microphone included in the shared vehicle.

In addition, the passenger recognition information may include fingerprint data of the passenger obtained through a fingerprint sensor included in the shared vehicle.

In addition, the method for providing clothing management service may further include requesting a service provision fee based on the completion message and receiving payment information according to the requesting.

In addition, the method for providing clothing management service may further include requesting opening of the clothing management device according to the payment information.

In addition, the receiving basic information may receive a first basic information for providing the service from a first terminal and a second basic information for providing the service from a second terminal.

At this time, the transmitting the recommended course may include generating a priority of each of the first terminal and the second terminal according to a first time at which the first basic information is received and a second time at which the second basic information is received, generating a first recommended course for the first terminal and a second recommended course for the second terminal according to the generated priority, and receiving first selection information for selecting the first recommended course and second selection information for selecting the second recommended course.

In addition, the method for providing clothing management service may include receiving operation state information according to the first operation command, and real-time driving information of the shared vehicle, and transmitting a second operation command for clothing management to the shared vehicle based on the operation state information and the real-time driving information.

In addition, in order to solve the above problems, the present disclosure, in a vehicle for providing clothing management service using a clothing management device, may include a clothing management device installed inside the vehicle, a sensing unit installed around the clothing management device and for sensing a passenger, a communication device for transmitting the sensed passenger recognition information to a server, and a processor that controls the clothing management device, the sensing unit, and the communication device.

In addition, the sensing unit may be at least one of a camera for recognizing an appearance of the passenger, a microphone for recognizing a voice of the passenger and a fingerprint sensor for recognizing a fingerprint of the passenger.

In addition, the communication device may receive passenger matching information and an operation command for the clothing management device from the server.

At this time, the communication device may receive a door opening request from the server, and the processor may open a door of the clothing management device according to the received door opening request.

At this time, the door opening request may be received from the server based on fee payment information according to an operation completion of the clothing management device.

In addition, the sensing unit may sense real-time driving information of the vehicle, and the communication device may transmit the real-time driving information to the server.

At this time, the communication device may receive a changed course according to the real-time driving information from the server, and the processor may control the operation of the clothing management device according to the changed course.

In addition, in order to solve the above problems, the present disclosure, in a method for operating a vehicle for providing clothing management service using a vehicle clothing management device, may include sensing information about a passenger in the vehicle, transmitting the sensed passenger information to a server, receiving passenger matching information, generated by the server, based on the transmitted information, and transmitting an operation command to the clothing management device installed in the vehicle based on the received passenger matching information.

In addition, the passenger information may be at least one of appearance information of the passenger, voice information of the passenger, and fingerprint information of the passenger.

At this time, the method for operating a vehicle for providing clothing management service may further include receiving a door opening request from the server, and opening a door of the clothing management device according to the received door opening request.

At this time, the door opening request may be received from the server based on fee payment information according to an operation completion of the clothing management device.

In addition, the method for operating a vehicle for providing clothing management service may further include sensing real-time driving information of the vehicle, and transmitting the real-time driving information to the server.

At this time, the method for operating a vehicle for providing clothing management service may further include receiving a changed course according to the real-time driving information from the server, and transmitting a changed operation command to the clothing management device according to the changed course.

The present disclosure has an effect of providing clothing management service in a shared vehicle in which a vehicle clothing management device is installed.

In addition, the present disclosure has an effect of providing a recommended course based on reservation information received from a user as a recommended course for the vehicle clothing management device.

In addition, the present disclosure has an effect of providing clothing management service through identification of passengers and persons who make reservations in the shared vehicle used by a large number of users.

The effects obtained in the present disclosure are not limited to the above-mentioned effects, and other effects not mentioned will be clearly understood by those skilled in the art to which the present disclosure pertains from the following description.

BRIEF DESCRIPTION OF THE DRAWINGS

The accompanying drawings, which are included as part of the detailed description to assist understanding of the invention, illustrate embodiments of the invention and explain the technical features of the invention together with the detailed description.

DETAILED DESCRIPTION OF THE EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Driving (1) Exterior of Vehicle

Figure 1:
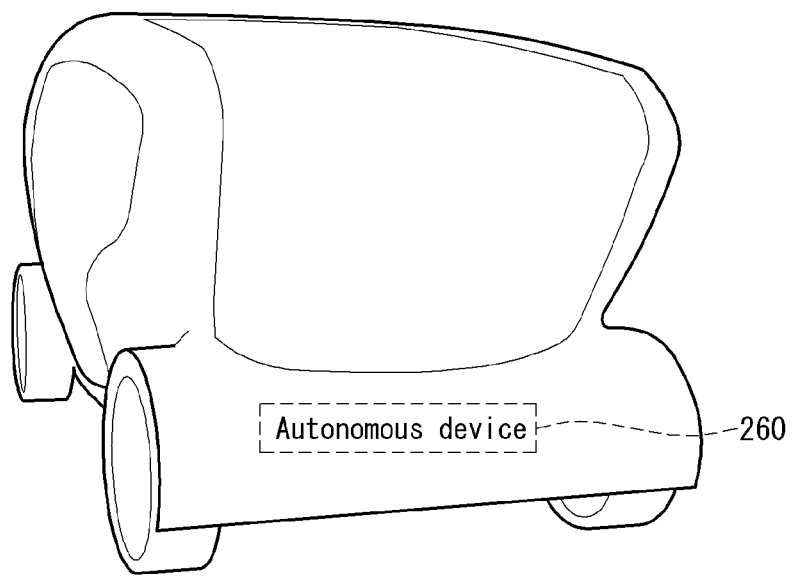
FIG. 1 illustrates a vehicle according to an embodiment of the present disclosure.
Figure 1:
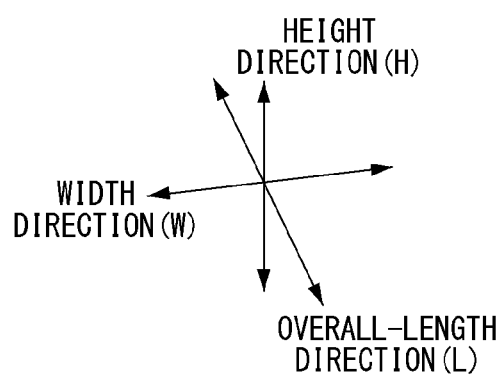

FIG. 1 is a diagram showing a vehicle according to an embodiment of the present disclosure.

Referring to FIG. 1, a vehicle 10 according to an embodiment of the present disclosure is defined as a transportation means traveling on roads or railroads. The vehicle 10 includes a car, a train and a motorcycle. The vehicle 10 may include an internal-combustion engine vehicle having an engine as a power source, a hybrid vehicle having an engine and a motor as a power source, and an electric vehicle having an electric motor as a power source. The vehicle 10 may be a private own vehicle. The vehicle 10 may be a shared vehicle. The vehicle 10 may be an autonomous vehicle.

(2) Components of Vehicle

Figure 2:
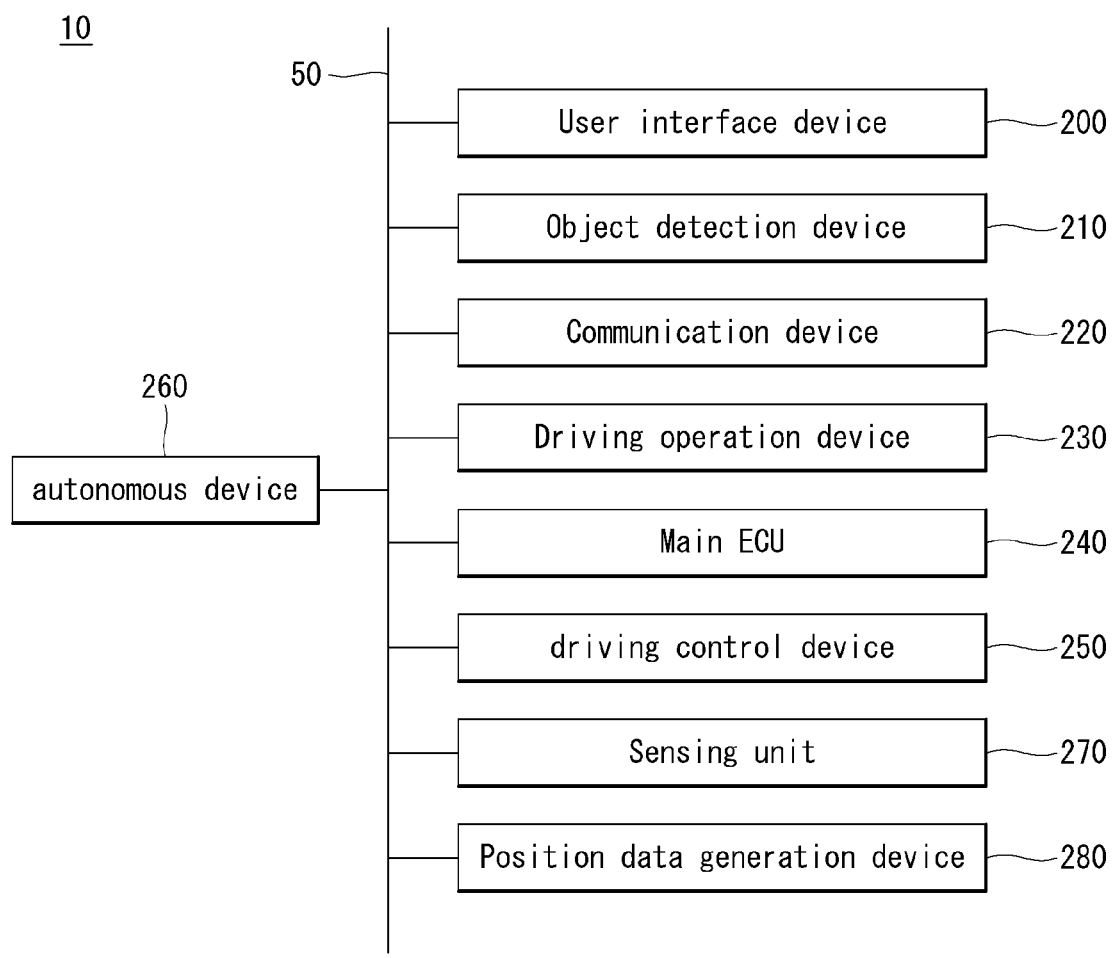
FIG. 2 is a control block diagram of the vehicle according to an embodiment of the present disclosure.

FIG. 2 is a control block diagram of the vehicle according to an embodiment of the present disclosure.

Referring to FIG. 2, the vehicle 10 may include a user interface device 200, an object detection device 210, a communication device 220, a driving operation device 230, a main ECU 240, a driving control device 250, an autonomous device 260, a sensing unit 270, and a position data generation device 280. The object detection device 210, the communication device 220, the driving operation device 230, the main ECU 240, the driving control device 250, the autonomous device 260, the sensing unit 270 and the position data generation device 280 may be realized by electronic devices which generate electric signals and exchange the electric signals from one another.

1) User Interface Device

The user interface device 200 is a device for communication between the vehicle 10 and a user. The user interface device 200 can receive user input and provide information generated in the vehicle 10 to the user. The vehicle 10 can realize a user interface (UI) or user experience (UX) through the user interface device 200. The user interface device 200 may include an input device, an output device and a user monitoring device.

2) Object Detection Device

The object detection device 210 can generate information about objects outside the vehicle 10. Information about an object can include at least one of information on presence or absence of the object, positional information of the object, information on a distance between the vehicle 10 and the object, and information on a relative speed of the vehicle 10 with respect to the object. The object detection device 210 can detect objects outside the vehicle 10. The object detection device 210 may include at least one sensor which can detect objects outside the vehicle 10. The object detection device 210 may include at least one of a camera, a radar, a lidar, an ultrasonic sensor and an infrared sensor. The object detection device 210 can provide data about an object generated on the basis of a sensing signal generated from a sensor to at least one electronic device included in the vehicle.

2.1) Camera

The camera can generate information about objects outside the vehicle 10 using images. The camera may include at least one lens, at least one image sensor, and at least one processor which is electrically connected to the image sensor, processes received signals and generates data about objects on the basis of the processed signals.

The camera may be at least one of a mono camera, a stereo camera and an around view monitoring (AVM) camera. The camera can acquire positional information of objects, information on distances to objects, or information on relative speeds with respect to objects using various image processing algorithms. For example, the camera can acquire information on a distance to an object and information on a relative speed with respect to the object from an acquired image on the basis of change in the size of the object over time. For example, the camera may acquire information on a distance to an object and information on a relative speed with respect to the object through a pin-hole model, road profiling, or the like. For example, the camera may acquire information on a distance to an object and information on a relative speed with respect to the object from a stereo image acquired from a stereo camera on the basis of disparity information.

The camera may be attached at a portion of the vehicle at which FOV (field of view) can be secured in order to photograph the outside of the vehicle. The camera may be disposed in proximity to the front windshield inside the vehicle in order to acquire front view images of the vehicle. The camera may be disposed near a front bumper or a radiator grill. The camera may be disposed in proximity to a rear glass inside the vehicle in order to acquire rear view images of the vehicle. The camera may be disposed near a rear bumper, a trunk or a tail gate. The camera may be disposed in proximity to at least one of side windows inside the vehicle in order to acquire side view images of the vehicle. Alternatively, the camera may be disposed near a side mirror, a fender or a door.

2.2) Radar

The radar can generate information about an object outside the vehicle using electromagnetic waves. The radar may include an electromagnetic wave transmitter, an electromagnetic wave receiver, and at least one processor which is electrically connected to the electromagnetic wave transmitter and the electromagnetic wave receiver, processes received signals and generates data about an object on the basis of the processed signals. The radar may be realized as a pulse radar or a continuous wave radar in terms of electromagnetic wave emission. The continuous wave radar may be realized as a frequency modulated continuous wave (FMCW) radar or a frequency shift keying (FSK) radar according to signal waveform. The radar can detect an object through electromagnetic waves on the basis of TOF (Time of Flight) or phase shift and detect the position of the detected object, a distance to the detected object and a relative speed with respect to the detected object. The radar may be disposed at an appropriate position outside the vehicle in order to detect objects positioned in front of, behind or on the side of the vehicle.

2.3) Lidar

The lidar can generate information about an object outside the vehicle 10 using a laser beam. The lidar may include a light transmitter, a light receiver, and at least one processor which is electrically connected to the light transmitter and the light receiver, processes received signals and generates data about an object on the basis of the processed signal. The lidar may be realized according to TOF or phase shift. The lidar may be realized as a driven type or a non-driven type. A driven type lidar may be rotated by a motor and detect an object around the vehicle 10. A non-driven type lidar may detect an object positioned within a predetermined range from the vehicle according to light steering. The vehicle 10 may include a plurality of non-drive type lidars. The lidar can detect an object through a laser beam on the basis of TOF (Time of Flight) or phase shift and detect the position of the detected object, a distance to the detected object and a relative speed with respect to the detected object. The lidar may be disposed at an appropriate position outside the vehicle in order to detect objects positioned in front of, behind or on the side of the vehicle.

3) Communication Device

The communication device 220 can exchange signals with devices disposed outside the vehicle 10. The communication device 220 can exchange signals with at least one of infrastructure (e.g., a server and a broadcast station), another vehicle and a terminal. The communication device 220 may include a transmission antenna, a reception antenna, and at least one of a radio frequency (RF) circuit and an RF element which can implement various communication protocols in order to perform communication.

In addition, the communication device 220 may exchange signals with an external device through vehicle-to-everything (V2X) communication technology. V2X communication may be provided through a PC5 interface and/or a Uu interface.

Meanwhile, the next generation radio access technology may be referred to as a new radio access technology (RAT) or a new radio (NR). Vehicle-to-everything (V2X) communication may also be supported in NR.

5G NR is a successor to LTE-A, and is a new clean-slate type mobile communication system having characteristics such as high performance, low latency, and high availability. 5G NR can utilize all available spectrum resources, from low frequency bands below 1 GHz to mid-frequency bands from 1 GHz to 10 GHz, and high frequency bands above 24 GHz (millimeter wave), etc.

In order to clarify the description, LTE-A or 5G NR is mainly described, but the technical spirit of the present disclosure is not limited thereto.

For example, the communication device can exchange signals with external devices on the basis of C-V2X (Cellular V2X). For example, C-V2X can include sidelink communication based on LTE and/or sidelink communication based on NR. Details related to C-V2X will be described later.

For example, the communication device can exchange signals with external devices on the basis of DSRC (Dedicated Short Range Communications) or WAVE (Wireless Access in Vehicular Environment) standards based on IEEE 802.11p PHY/MAC layer technology and IEEE 1609 Network/Transport layer technology. DSRC (or WAVE standards) is communication specifications for providing an intelligent transport system (ITS) service through short-range dedicated communication between vehicle-mounted devices or between a roadside device and a vehicle-mounted device. DSRC may be a communication scheme that can use a frequency of 5.9 GHz and have a data transfer rate in the range of 3 Mbps to 27 Mbps. IEEE 802.11p may be combined with IEEE 1609 to support DSRC (or WAVE standards).

The communication device of the present disclosure can exchange signals with external devices using only one of C-V2X and DSRC. Alternatively, the communication device of the present disclosure can exchange signals with external devices using a hybrid of C-V2X and DSRC.

4) Driving Operation Device

The driving operation device 230 is a device for receiving user input for driving. In a manual mode, the vehicle 10 may be driven on the basis of a signal provided by the driving operation device 230. The driving operation device 230 may include a steering input device (e.g., a steering wheel), an acceleration input device (e.g., an acceleration pedal) and a brake input device (e.g., a brake pedal).

5) Main ECU

The main ECU 240 can control the overall operation of at least one electronic device included in the vehicle 10.

6) Driving Control Device

The driving control device 250 is a device for electrically controlling various vehicle driving devices included in the vehicle 10. The driving control device 250 may include a power train driving control device, a chassis driving control device, a door/window driving control device, a safety device driving control device, a lamp driving control device, and an air-conditioner driving control device. The power train driving control device may include a power source driving control device and a transmission driving control device. The chassis driving control device may include a steering driving control device, a brake driving control device and a suspension driving control device. Meanwhile, the safety device driving control device may include a seat belt driving control device for seat belt control.

The driving control device 250 includes at least one electronic control device (e.g., a control ECU (Electronic Control Unit)).

The driving control device 250 can control vehicle driving devices on the basis of signals received by the autonomous device 260. For example, the driving control device 250 can control a power train, a steering device and a brake device on the basis of signals received by the autonomous device 260.

7) Autonomous Device

The autonomous device 260 can generate a route for self-driving on the basis of acquired data. The autonomous device 260 can generate a driving plan for traveling along the generated route. The autonomous device 260 can generate a signal for controlling movement of the vehicle according to the driving plan. The autonomous device 260 can provide the signal to the driving control device 250.

The autonomous device 260 can implement at least one ADAS (Advanced Driver Assistance System) function. The ADAS can implement at least one of ACC (Adaptive Cruise Control), AEB (Autonomous Emergency Braking), FCW (Forward Collision Warning), LKA (Lane Keeping Assist), LCA (Lane Change Assist), TFA (Target Following Assist), BSD (Blind Spot Detection), HBA (High Beam Assist), APS (Auto Parking System), a PD collision warning system, TSR (Traffic Sign Recognition), TSA (Traffic Sign Assist), NV (Night Vision), DSM (Driver Status Monitoring) and TJA (Traffic Jam Assist).

The autonomous device 260 can perform switching from a self-driving mode to a manual driving mode or switching from the manual driving mode to the self-driving mode. For example, the autonomous device 260 can switch the mode of the vehicle 10 from the self-driving mode to the manual driving mode or from the manual driving mode to the self-driving mode on the basis of a signal received from the user interface device 200.

8) Sensing Unit

The sensing unit 270 can detect a state of the vehicle. The sensing unit 270 may include at least one of an internal measurement unit (IMU) sensor, a collision sensor, a wheel sensor, a speed sensor, an inclination sensor, a weight sensor, a heading sensor, a position module, a vehicle forward/backward movement sensor, a battery sensor, a fuel sensor, a tire sensor, a steering sensor, a temperature sensor, a humidity sensor, an ultrasonic sensor, an illumination sensor, and a pedal position sensor. Further, the IMU sensor may include one or more of an acceleration sensor, a gyro sensor and a magnetic sensor.

The sensing unit 270 can generate vehicle state data on the basis of a signal generated from at least one sensor. Vehicle state data may be information generated on the basis of data detected by various sensors included in the vehicle. The sensing unit 270 may generate vehicle attitude data, vehicle motion data, vehicle yaw data, vehicle roll data, vehicle pitch data, vehicle collision data, vehicle orientation data, vehicle angle data, vehicle speed data, vehicle acceleration data, vehicle tilt data, vehicle forward/backward movement data, vehicle weight data, battery data, fuel data, tire pressure data, vehicle internal temperature data, vehicle internal humidity data, steering wheel rotation angle data, vehicle external illumination data, data of a pressure applied to an acceleration pedal, data of a pressure applied to a brake panel, etc.

9) Position Data Generation Device

The position data generation device 280 can generate position data of the vehicle 10. The position data generation device 280 may include at least one of a global positioning system (GPS) and a differential global positioning system (DGPS). The position data generation device 280 can generate position data of the vehicle 10 on the basis of a signal generated from at least one of the GPS and the DGPS. According to an embodiment, the position data generation device 280 can correct position data on the basis of at least one of the inertial measurement unit (IMU) sensor of the sensing unit 270 and the camera of the object detection device 210. The position data generation device 280 may also be called a global navigation satellite system (GNSS).

The vehicle 10 may include an internal communication system 50. The plurality of electronic devices included in the vehicle 10 can exchange signals through the internal communication system 50. The signals may include data. The internal communication system 50 can use at least one communication protocol (e.g., CAN, LIN, FlexRay, MOST or Ethernet).

(3) Components of Autonomous Device

Figure 3:
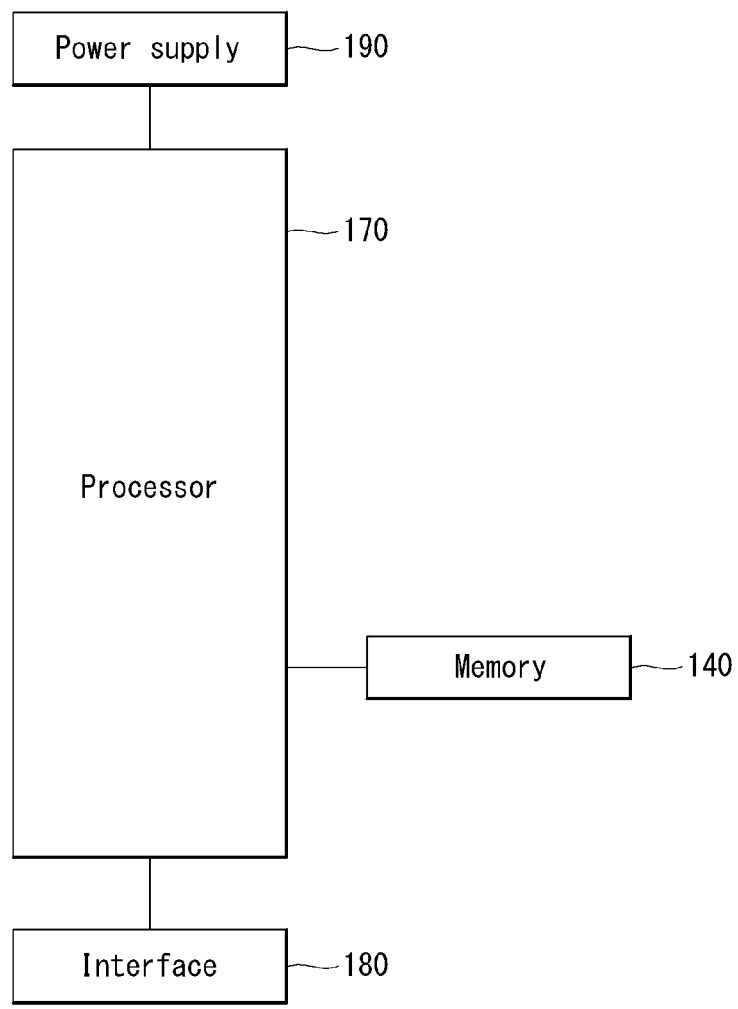
FIG. 3 is a control block diagram of an autonomous device according to an embodiment of the present disclosure.

FIG. 3 is a control block diagram of the autonomous device according to an embodiment of the present disclosure.

Referring to FIG. 3, the autonomous device 260 may include a memory 140, a processor 170, an interface 180 and a power supply 190.

The memory 140 is electrically connected to the processor 170. The memory 140 can store basic data with respect to units, control data for operation control of units, and input/output data. The memory 140 can store data processed in the processor 170. Hardware-wise, the memory 140 can be configured as at least one of a ROM, a RAM, an EPROM, a flash drive and a hard drive. The memory 140 can store various types of data for overall operation of the autonomous device 260, such as a program for processing or control of the processor 170. The memory 140 may be integrated with the processor 170. According to an embodiment, the memory 140 may be categorized as a subcomponent of the processor 170.

The interface 180 can exchange signals with at least one electronic device included in the vehicle 10 in a wired or wireless manner. The interface 180 can exchange signals with at least one of the object detection device 210, the communication device 220, the driving operation device 230, the main ECU 240, the driving control device 250, the sensing unit 270 and the position data generation device 280 in a wired or wireless manner. The interface 180 can be configured using at least one of a communication module, a terminal, a pin, a cable, a port, a circuit, an element and a device.

The power supply 190 can provide power to the autonomous device 260. The power supply 190 can be provided with power from a power source (e.g., a battery) included in the vehicle 10 and supply the power to each unit of the autonomous device 260. The power supply 190 can operate according to a control signal supplied from the main ECU 240. The power supply 190 may include a switched-mode power supply (SMPS).

The processor 170 can be electrically connected to the memory 140, the interface 180 and the power supply 190 and exchange signals with these components. The processor 170 can be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The processor 170 can be operated by power supplied from the power supply 190. The processor 170 can receive data, process the data, generate a signal and provide the signal while power is supplied thereto.

The processor 170 can receive information from other electronic devices included in the vehicle 10 through the interface 180. The processor 170 can provide control signals to other electronic devices in the vehicle 10 through the interface 180.

The autonomous device 260 may include at least one printed circuit board (PCB). The memory 140, the interface 180, the power supply 190 and the processor 170 may be electrically connected to the PCB.

(4) Operation of Autonomous Device

Figure 4:
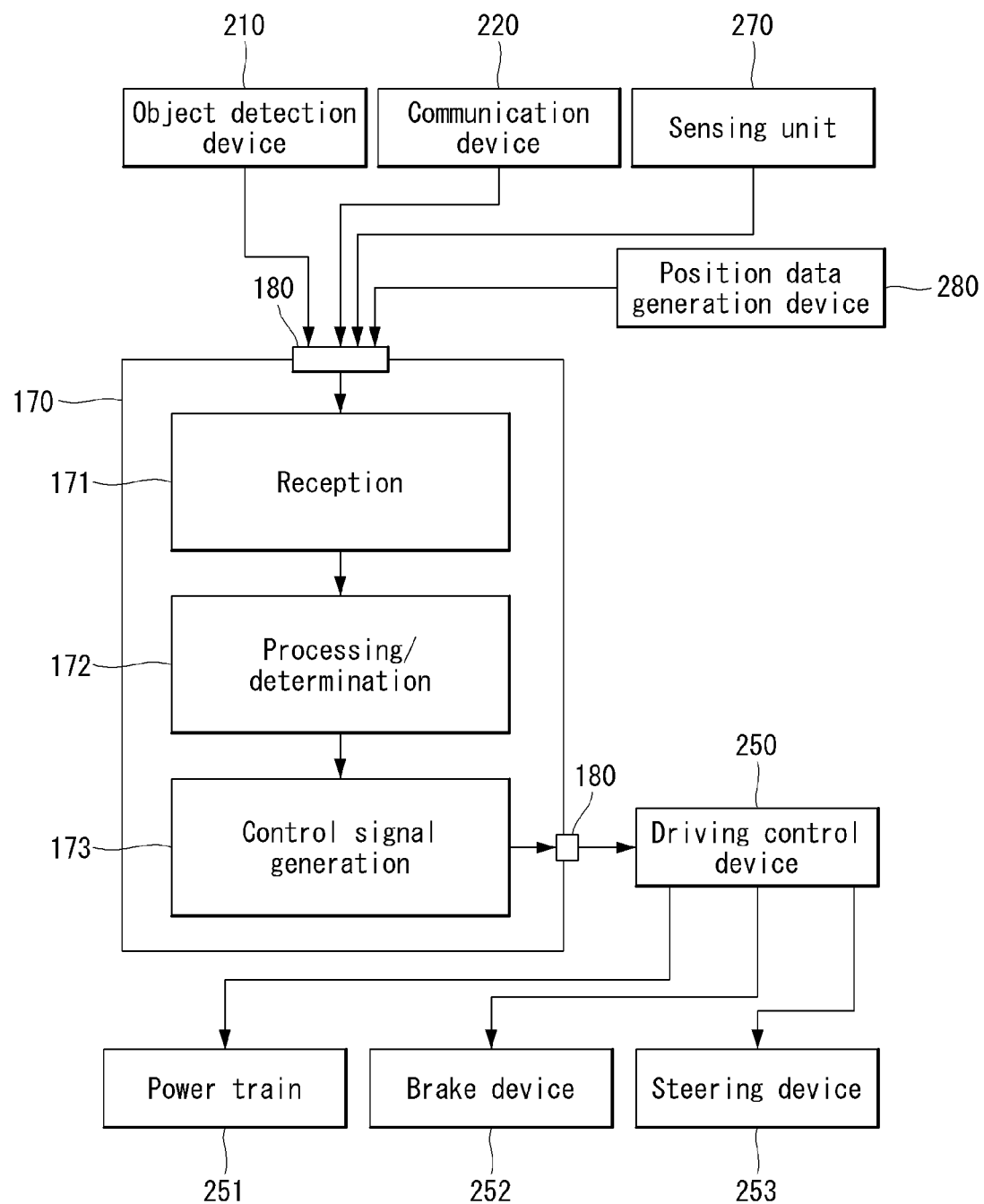
FIG. 4 is a diagram showing a signal flow in an autonomous vehicle according to an embodiment of the present disclosure.

FIG. 4 is a diagram showing a signal flow in an autonomous vehicle according to an embodiment of the present disclosure.

1) Reception Operation

Referring to FIG. 4, the processor 170 can perform a reception operation. The processor 170 can receive data from at least one of the object detection device 210, the communication device 220, the sensing unit 270 and the position data generation device 280 through the interface 180. The processor 170 can receive object data from the object detection device 210. The processor 170 can receive HD map data from the communication device 220. The processor 170 can receive vehicle state data from the sensing unit 270. The processor 170 can receive position data from the position data generation device 280.

2) Processing/Determination Operation

The processor 170 can perform a processing/determination operation. The processor 170 can perform the processing/determination operation on the basis of traveling situation information. The processor 170 can perform the processing/determination operation on the basis of at least one of object data, HD map data, vehicle state data and position data.

2.1) Driving Plan Data Generation Operation

The processor 170 can generate driving plan data. For example, the processor 170 may generate electronic horizon data. The electronic horizon data can be understood as driving plan data in a range from a position at which the vehicle 10 is located to a horizon. The horizon can be understood as a point a predetermined distance before the position at which the vehicle 10 is located on the basis of a predetermined traveling route. The horizon may refer to a point at which the vehicle can arrive after a predetermined time from the position at which the vehicle 10 is located along a predetermined traveling route.

The electronic horizon data can include horizon map data and horizon path data.

2.1.1) Horizon Map Data

The horizon map data may include at least one of topology data, road data, HD map data and dynamic data. According to an embodiment, the horizon map data may include a plurality of layers. For example, the horizon map data may include a first layer that matches the topology data, a second layer that matches the road data, a third layer that matches the HD map data, and a fourth layer that matches the dynamic data. The horizon map data may further include static object data.

The topology data may be explained as a map created by connecting road centers. The topology data is suitable for approximate display of a location of a vehicle and may have a data form used for navigation for drivers. The topology data may be understood as data about road information other than information on driveways. The topology data may be generated on the basis of data received from an external server through the communication device 220. The topology data may be based on data stored in at least one memory included in the vehicle 10.

The road data may include at least one of road slope data, road curvature data and road speed limit data. The road data may further include no-passing zone data. The road data may be based on data received from an external server through the communication device 220. The road data may be based on data generated in the object detection device 210.

The HD map data may include detailed topology information in units of lanes of roads, connection information of each lane, and feature information for vehicle localization (e.g., traffic signs, lane marking/attribute, road furniture, etc.). The HD map data may be based on data received from an external server through the communication device 220.

The dynamic data may include various types of dynamic information which can be generated on roads. For example, the dynamic data may include construction information, variable speed road information, road condition information, traffic information, moving object information, etc. The dynamic data may be based on data received from an external server through the communication device 220. The dynamic data may be based on data generated in the object detection device 210.

The processor 170 can provide map data in a range from a position at which the vehicle 10 is located to the horizon.

2.1.2) Horizon Path Data

The horizon path data may be explained as a trajectory through which the vehicle 10 can travel in a range from a position at which the vehicle 10 is located to the horizon. The horizon path data may include data indicating a relative probability of selecting a road at a decision point (e.g., a fork, a junction, a crossroad, or the like). The relative probability may be calculated on the basis of a time taken to arrive at a final destination. For example, if a time taken to arrive at a final destination is shorter when a first road is selected at a decision point than that when a second road is selected, a probability of selecting the first road can be calculated to be higher than a probability of selecting the second road.

The horizon path data can include a main path and a sub-path. The main path may be understood as a trajectory obtained by connecting roads having a high relative probability of being selected. The sub-path can be branched from at least one decision point on the main path. The sub-path may be understood as a trajectory obtained by connecting at least one road having a low relative probability of being selected at at least one decision point on the main path.

3) Control Signal Generation Operation

The processor 170 can perform a control signal generation operation. The processor 170 can generate a control signal on the basis of the electronic horizon data. For example, the processor 170 may generate at least one of a power train control signal, a brake device control signal and a steering device control signal on the basis of the electronic horizon data.

The processor 170 can transmit the generated control signal to the driving control device 250 through the interface 180. The driving control device 250 can transmit the control signal to at least one of a power train 251, a brake device 252 and a steering device 254.

Cabin

Figure 5:
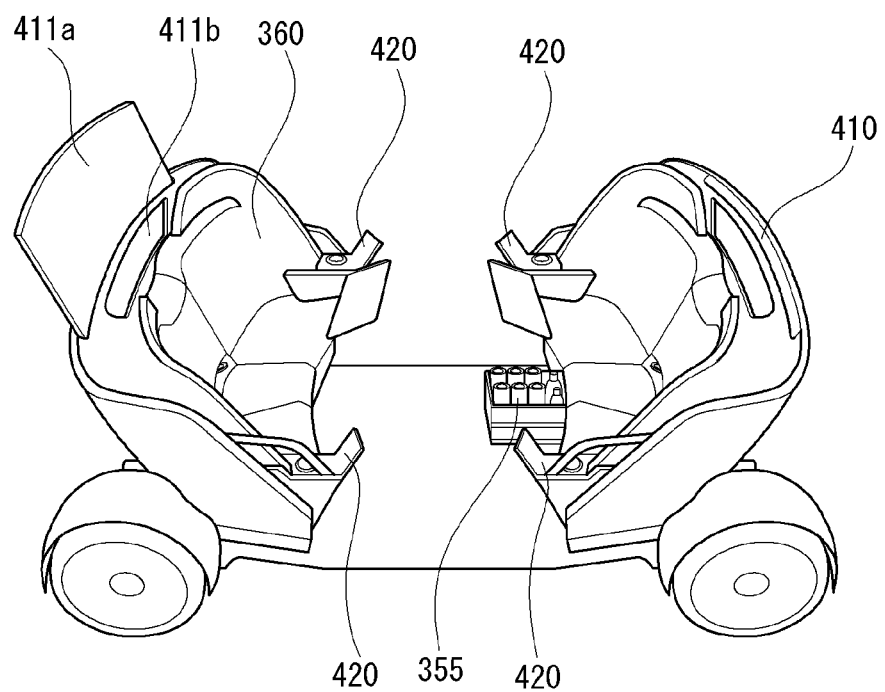
FIG. 5 is a diagram illustrating the interior of a vehicle according to an embodiment of the present disclosure.
Figure 6:
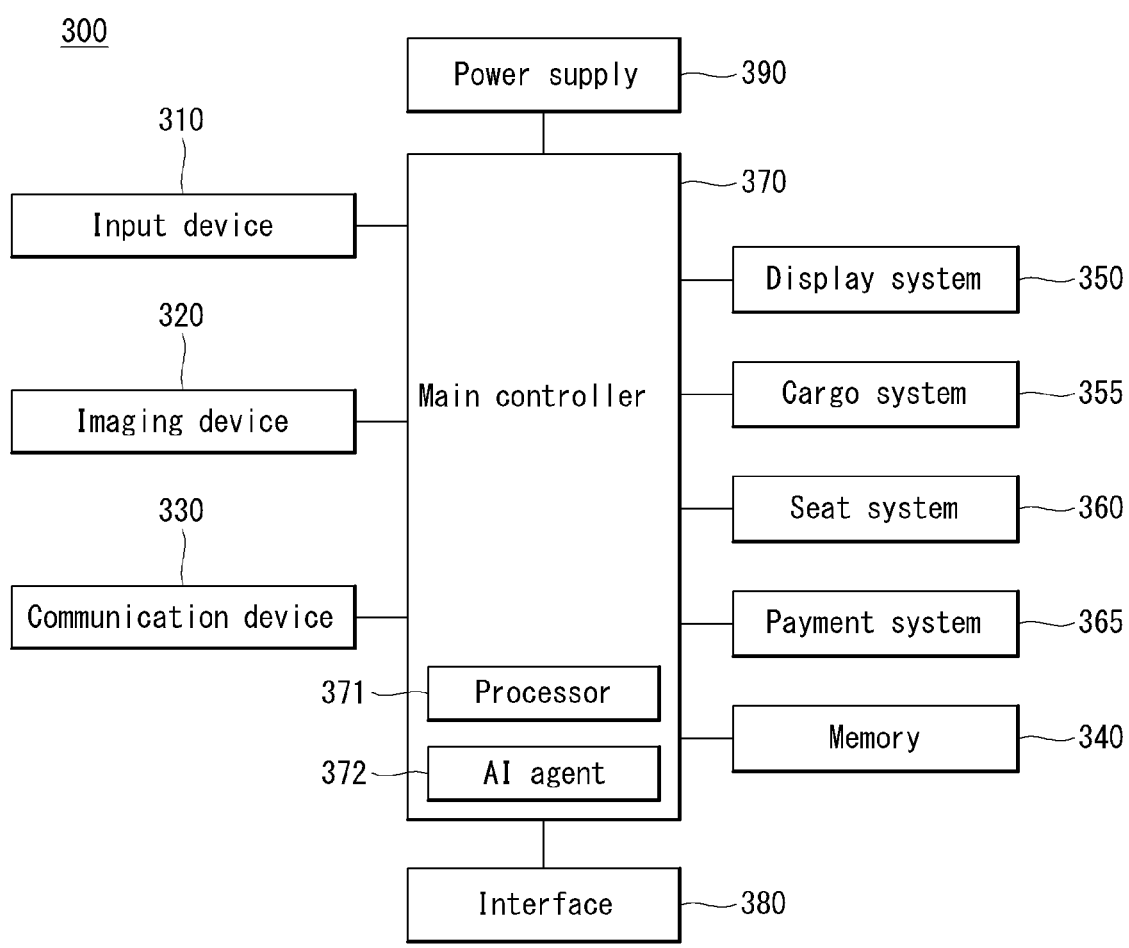
FIG. 6 is a block diagram referred to in description of a cabin system for a vehicle according to an embodiment of the present disclosure.

FIG. 5 is a diagram showing the interior of the vehicle according to an embodiment of the present disclosure. FIG. 6 is a block diagram referred to in description of a cabin system for a vehicle according to an embodiment of the present disclosure.

(1) Components of Cabin

Referring to FIGS. 5 and 6, a cabin system 300 for a vehicle (hereinafter, a cabin system) can be defined as a convenience system for a user who uses the vehicle 10. The cabin system 300 can be explained as a high-end system including a display system 350, a cargo system 355, a seat system 360 and a payment system 365. The cabin system 300 may include a main controller 370, a memory 340, an interface 380, a power supply 390, an input device 310, an imaging device 320, a communication device 330, the display system 350, the cargo system 355, the seat system 360 and the payment system 365. The cabin system 300 may further include components in addition to the components described in this specification or may not include some of the components described in this specification according to embodiments.

1) Main Controller

The main controller 370 can be electrically connected to the input device 310, the communication device 330, the display system 350, the cargo system 355, the seat system 360 and the payment system 365 and exchange signals with these components. The main controller 370 can control the input device 310, the communication device 330, the display system 350, the cargo system 355, the seat system 360 and the payment system 365. The main controller 370 may be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The main controller 370 may be configured as at least one sub-controller. The main controller 370 may include a plurality of sub-controllers according to an embodiment. The plurality of sub-controllers may individually control the devices and systems included in the cabin system 300. The devices and systems included in the cabin system 300 may be grouped by function or grouped on the basis of seats on which a user can sit.

The main controller 370 may include at least one processor 371. Although FIG. 6 illustrates the main controller 370 including a single processor 371, the main controller 371 may include a plurality of processors. The processor 371 may be categorized as one of the above-described sub-controllers.

The processor 371 can receive signals, information or data from a user terminal through the communication device 330. The user terminal can transmit signals, information or data to the cabin system 300.

The processor 371 can identify a user on the basis of image data received from at least one of an internal camera and an external camera included in the imaging device. The processor 371 can identify a user by applying an image processing algorithm to the image data. For example, the processor 371 may identify a user by comparing information received from the user terminal with the image data. For example, the information may include at least one of route information, body information, fellow passenger information, baggage information, position information, preferred content information, preferred food information, disability information and use history information of a user.

The main controller 370 may include an artificial intelligence (AI) agent 372. The AI agent 372 can perform machine learning on the basis of data acquired through the input device 310. The AI agent 371 can control at least one of the display system 350, the cargo system 355, the seat system 360 and the payment system 365 on the basis of machine learning results.

2) Essential Components

The memory 340 is electrically connected to the main controller 370. The memory 340 can store basic data about units, control data for operation control of units, and input/output data. The memory 340 can store data processed in the main controller 370. Hardware-wise, the memory 340 may be configured using at least one of a ROM, a RAM, an EPROM, a flash drive and a hard drive. The memory 340 can store various types of data for the overall operation of the cabin system 300, such as a program for processing or control of the main controller 370. The memory 340 may be integrated with the main controller 370.

The interface 380 can exchange signals with at least one electronic device included in the vehicle 10 in a wired or wireless manner. The interface 380 may be configured using at least one of a communication module, a terminal, a pin, a cable, a port, a circuit, an element and a device.

The power supply 390 can provide power to the cabin system 300. The power supply 390 can be provided with power from a power source (e.g., a battery) included in the vehicle 10 and supply the power to each unit of the cabin system 300. The power supply 390 can operate according to a control signal supplied from the main controller 370. For example, the power supply 390 may be implemented as a switched-mode power supply (SMPS).

The cabin system 300 may include at least one printed circuit board (PCB). The main controller 370, the memory 340, the interface 380 and the power supply 390 may be mounted on at least one PCB.

3) Input Device

The input device 310 can receive a user input. The input device 310 can convert the user input into an electrical signal. The electrical signal converted by the input device 310 can be converted into a control signal and provided to at least one of the display system 350, the cargo system 355, the seat system 360 and the payment system 365. The main controller 370 or at least one processor included in the cabin system 300 can generate a control signal based on an electrical signal received from the input device 310.

The input device 310 may include at least one of a touch input unit, a gesture input unit, a mechanical input unit and a voice input unit. The touch input unit can convert a user's touch input into an electrical signal. The touch input unit may include at least one touch sensor for detecting a user's touch input. According to an embodiment, the touch input unit can realize a touch screen by integrating with at least one display included in the display system 350. Such a touch screen can provide both an input interface and an output interface between the cabin system 300 and a user. The gesture input unit can convert a user's gesture input into an electrical signal. The gesture input unit may include at least one of an infrared sensor and an image sensor for detecting a user's gesture input. According to an embodiment, the gesture input unit can detect a user's three-dimensional gesture input. To this end, the gesture input unit may include a plurality of light output units for outputting infrared light or a plurality of image sensors. The gesture input unit may detect a user's three-dimensional gesture input using TOF (Time of Flight), structured light or disparity. The mechanical input unit can convert a user's physical input (e.g., press or rotation) through a mechanical device into an electrical signal. The mechanical input unit may include at least one of a button, a dome switch, a jog wheel and a jog switch. Meanwhile, the gesture input unit and the mechanical input unit may be integrated. For example, the input device 310 may include a jog dial device that includes a gesture sensor and is formed such that it can be inserted/ejected into/from a part of a surrounding structure (e.g., at least one of a seat, an armrest and a door). When the jog dial device is parallel to the surrounding structure, the jog dial device can serve as a gesture input unit. When the jog dial device is protruded from the surrounding structure, the jog dial device can serve as a mechanical input unit. The voice input unit can convert a user's voice input into an electrical signal. The voice input unit may include at least one microphone. The voice input unit may include a beam forming MIC.

4) Imaging Device

The imaging device 320 can include at least one camera. The imaging device 320 may include at least one of an internal camera and an external camera. The internal camera can capture an image of the inside of the cabin. The external camera can capture an image of the outside of the vehicle. The internal camera can acquire an image of the inside of the cabin. The imaging device 320 may include at least one internal camera. It is desirable that the imaging device 320 include as many cameras as the number of passengers who can ride in the vehicle. The imaging device 320 can provide an image acquired by the internal camera. The main controller 370 or at least one processor included in the cabin system 300 can detect a motion of a user on the basis of an image acquired by the internal camera, generate a signal on the basis of the detected motion and provide the signal to at least one of the display system 350, the cargo system 355, the seat system 360 and the payment system 365. The external camera can acquire an image of the outside of the vehicle. The imaging device 320 may include at least one external camera. It is desirable that the imaging device 320 include as many cameras as the number of doors through which passengers ride in the vehicle. The imaging device 320 can provide an image acquired by the external camera. The main controller 370 or at least one processor included in the cabin system 300 can acquire user information on the basis of the image acquired by the external camera. The main controller 370 or at least one processor included in the cabin system 300 can authenticate a user or acquire body information (e.g., height information, weight information, etc.), fellow passenger information and baggage information of a user on the basis of the user information.

5) Communication Device

The communication device 330 can exchange signals with external devices in a wireless manner. The communication device 330 can exchange signals with external devices through a network or directly exchange signals with external devices. External devices may include at least one of a server, a mobile terminal and another vehicle. The communication device 330 may exchange signals with at least one user terminal. The communication device 330 may include an antenna and at least one of an RF circuit and an RF element which can implement at least one communication protocol in order to perform communication. According to an embodiment, the communication device 330 may use a plurality of communication protocols. The communication device 330 may switch communication protocols according to a distance to a mobile terminal.

For example, the communication device can exchange signals with external devices on the basis of C-V2X (Cellular V2X). For example, C-V2X may include sidelink communication based on LTE and/or sidelink communication based on NR. Details related to C-V2X will be described later.

For example, the communication device can exchange signals with external devices on the basis of DSRC (Dedicated Short Range Communications) or WAVE (Wireless Access in Vehicular Environment) standards based on IEEE 802.11p PHY/MAC layer technology and IEEE 1609 Network/Transport layer technology. DSRC (or WAVE standards) is communication specifications for providing an intelligent transport system (ITS) service through short-range dedicated communication between vehicle-mounted devices or between a roadside device and a vehicle-mounted device. DSRC may be a communication scheme that can use a frequency of 5.9 GHz and have a data transfer rate in the range of 3 Mbps to 27 Mbps. IEEE 802.11p may be combined with IEEE 1609 to support DSRC (or WAVE standards).

The communication device of the present disclosure can exchange signals with external devices using only one of C-V2X and DSRC. Alternatively, the communication device of the present disclosure can exchange signals with external devices using a hybrid of C-V2X and DSRC.

6) Display System

The display system 350 can display graphic objects. The display system 350 may include at least one display device. For example, the display system 350 may include a first display device 410 for common use and a second display device 420 for individual use.

6.1) Common Display Device

The first display device 410 may include at least one display 411 which outputs visual content. The display 411 included in the first display device 410 may be realized by at least one of a flat panel display, a curved display, a rollable display and a flexible display. For example, the first display device 410 may include a first display 411 which is positioned behind a seat and formed to be inserted/ejected into/from the cabin, and a first mechanism for moving the first display 411. The first display 411 may be disposed such that it can be inserted/ejected into/from a slot formed in a seat main frame. According to an embodiment, the first display device 410 may further include a flexible area control mechanism. The first display may be formed to be flexible and a flexible area of the first display may be controlled according to user position. For example, the first display device 410 may be disposed on the ceiling inside the cabin and include a second display formed to be rollable and a second mechanism for rolling or unrolling the second display. The second display may be formed such that images can be displayed on both sides thereof. For example, the first display device 410 may be disposed on the ceiling inside the cabin and include a third display formed to be flexible and a third mechanism for bending or unbending the third display. According to an embodiment, the display system 350 may further include at least one processor which provides a control signal to at least one of the first display device 410 and the second display device 420. The processor included in the display system 350 can generate a control signal on the basis of a signal received from at last one of the main controller 370, the input device 310, the imaging device 320 and the communication device 330.

A display area of a display included in the first display device 410 may be divided into a first area 411a and a second area 411b. The first area 411a can be defined as a content display area. For example, the first area 411 may display at least one of graphic objects corresponding to can display entertainment content (e.g., movies, sports, shopping, food, etc.), video conferences, food menu and augmented reality screens. The first area 411a may display graphic objects corresponding to traveling situation information of the vehicle 10. The traveling situation information may include at least one of object information outside the vehicle, navigation information and vehicle state information. The object information outside the vehicle may include information on presence or absence of an object, positional information of an object, information on a distance between the vehicle and an object, and information on a relative speed of the vehicle with respect to an object. The navigation information may include at least one of map information, information on a set destination, route information according to setting of the destination, information on various objects on a route, lane information and information on the current position of the vehicle. The vehicle state information may include vehicle attitude information, vehicle speed information, vehicle tilt information, vehicle weight information, vehicle orientation information, vehicle battery information, vehicle fuel information, vehicle tire pressure information, vehicle steering information, vehicle indoor temperature information, vehicle indoor humidity information, pedal position information, vehicle engine temperature information, etc. The second area 411b can be defined as a user interface area. For example, the second area 411b may display an AI agent screen. The second area 411b may be located in an area defined by a seat frame according to an embodiment. In this case, a user can view content displayed in the second area 411b between seats. The first display device 410 may provide hologram content according to an embodiment. For example, the first display device 410 may provide hologram content for each of a plurality of users such that only a user who requests the content can view the content.

6.2) Display Device for Individual Use

The second display device 420 can include at least one display 421. The second display device 420 can provide the display 421 at a position at which only an individual passenger can view display content. For example, the display 421 may be disposed on an armrest of a seat. The second display device 420 can display graphic objects corresponding to personal information of a user. The second display device 420 may include as many displays 421 as the number of passengers who can ride in the vehicle. The second display device 420 can realize a touch screen by forming a layered structure along with a touch sensor or being integrated with the touch sensor. The second display device 420 can display graphic objects for receiving a user input for seat adjustment or indoor temperature adjustment.

7) Cargo System

The cargo system 355 can provide items to a user at the request of the user. The cargo system 355 can operate on the basis of an electrical signal generated by the input device 310 or the communication device 330. The cargo system 355 can include a cargo box. The cargo box can be hidden in a part under a seat. When an electrical signal based on user input is received, the cargo box can be exposed to the cabin. The user can select a necessary item from articles loaded in the cargo box. The cargo system 355 may include a sliding moving mechanism and an item pop-up mechanism in order to expose the cargo box according to user input. The cargo system 355 may include a plurality of cargo boxes in order to provide various types of items. A weight sensor for determining whether each item is provided may be embedded in the cargo box.

8) Seat System

The seat system 360 can provide a user customized seat to a user. The seat system 360 can operate on the basis of an electrical signal generated by the input device 310 or the communication device 330. The seat system 360 can adjust at least one element of a seat on the basis of acquired user body data. The seat system 360 may include a user detection sensor (e.g., a pressure sensor) for determining whether a user sits on a seat. The seat system 360 may include a plurality of seats on which a plurality of users can sit. One of the plurality of seats can be disposed to face at least another seat. At least two users can set facing each other inside the cabin.

9) Payment System

The payment system 365 can provide a payment service to a user. The payment system 365 can operate on the basis of an electrical signal generated by the input device 310 or the communication device 330. The payment system 365 can calculate a price for at least one service used by the user and request the user to pay the calculated price.

(2) Autonomous Vehicle Usage Scenarios

Figure 7:
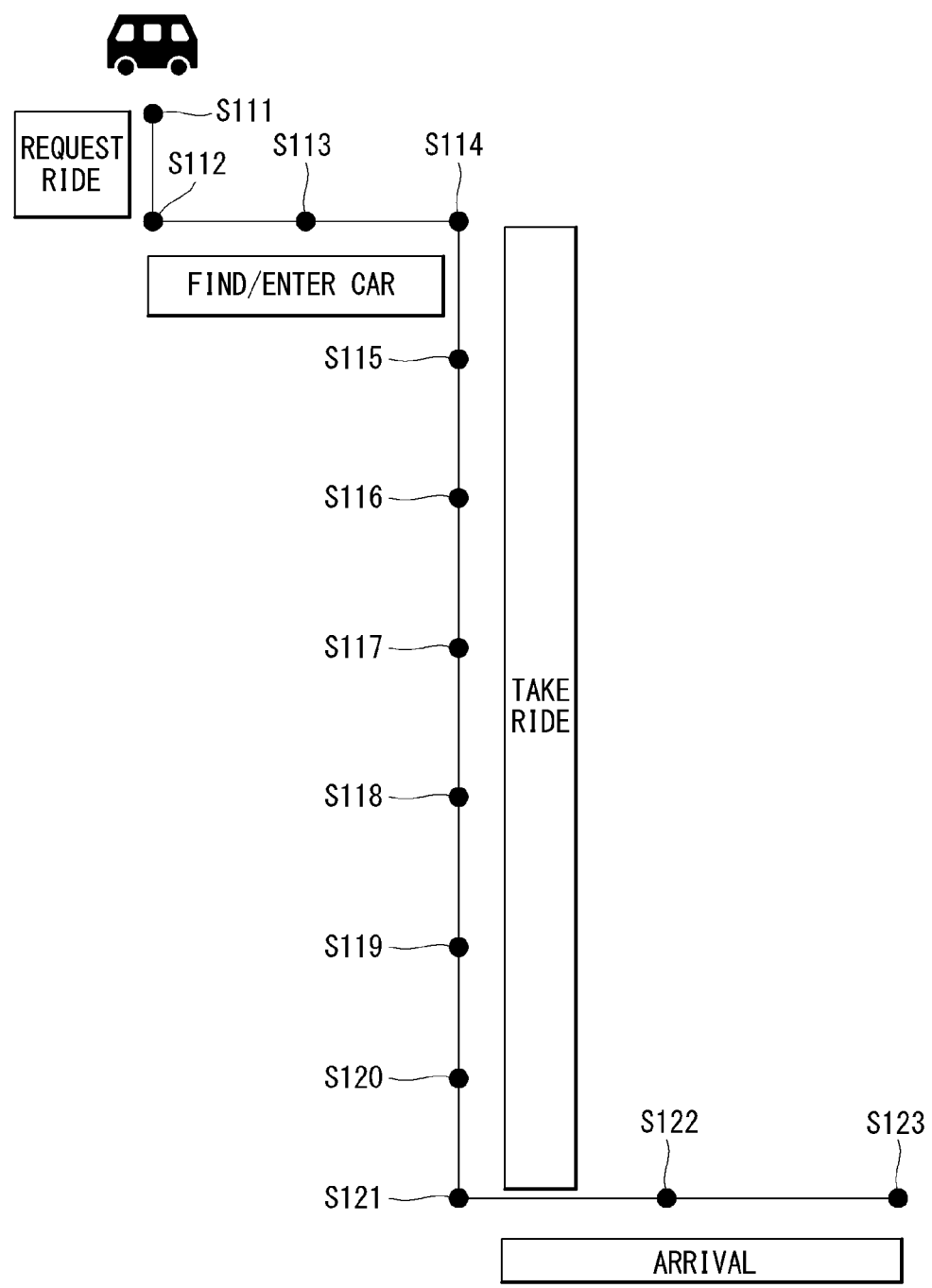
FIG. 7 is a diagram for describing a use scenario of a user according to an embodiment of the present disclosure.

FIG. 7 is a diagram referred to in description of a usage scenario of a user according to an embodiment of the present disclosure.

1) Destination Prediction Scenario

A first scenario S111 is a scenario for prediction of a destination of a user. An application which can operate in connection with the cabin system 300 can be installed in a user terminal. The user terminal can predict a destination of a user on the basis of user's contextual information through the application. The user terminal can provide information on unoccupied seats in the cabin through the application.

2) Cabin Interior Layout Preparation Scenario

A second scenario S112 is a cabin interior layout preparation scenario. The cabin system 300 may further include a scanning device for acquiring data about a user located outside the vehicle. The scanning device can scan a user to acquire body data and baggage data of the user. The body data and baggage data of the user can be used to set a layout. The body data of the user can be used for user authentication. The scanning device may include at least one image sensor. The image sensor can acquire a user image using light of the visible band or infrared band.

The seat system 360 can set a cabin interior layout on the basis of at least one of the body data and baggage data of the user. For example, the seat system 360 may provide a baggage compartment or a car seat installation space.

3) User Welcome Scenario

A third scenario S113 is a user welcome scenario. The cabin system 300 may further include at least one guide light. The guide light can be disposed on the floor of the cabin. When a user riding in the vehicle is detected, the cabin system 300 can turn on the guide light such that the user sits on a predetermined seat among a plurality of seats. For example, the main controller 370 may realize a moving light by sequentially turning on a plurality of light sources over time from an open door to a predetermined user seat.

4) Seat Adjustment Service Scenario

A fourth scenario S114 is a seat adjustment service scenario. The seat system 360 can adjust at least one element of a seat that matches a user on the basis of acquired body information.

5) Personal Content Provision Scenario

A fifth scenario S115 is a personal content provision scenario. The display system 350 can receive user personal data through the input device 310 or the communication device 330. The display system 350 can provide content corresponding to the user personal data.

6) Item Provision Scenario

A sixth scenario S116 is an item provision scenario. The cargo system 355 can receive user data through the input device 310 or the communication device 330. The user data may include user preference data, user destination data, etc. The cargo system 355 can provide items on the basis of the user data.

7) Payment Scenario

A seventh scenario S117 is a payment scenario. The payment system 365 can receive data for price calculation from at least one of the input device 310, the communication device 330 and the cargo system 355. The payment system 365 can calculate a price for use of the vehicle by the user on the basis of the received data. The payment system 365 can request payment of the calculated price from the user (e.g., a mobile terminal of the user).

8) Display System Control Scenario of User

An eighth scenario S118 is a display system control scenario of a user. The input device 310 can receive a user input having at least one form and convert the user input into an electrical signal. The display system 350 can control displayed content on the basis of the electrical signal.

9) AI Agent Scenario

A ninth scenario S119 is a multi-channel artificial intelligence (AI) agent scenario for a plurality of users. The AI agent 372 can discriminate user inputs from a plurality of users. The AI agent 372 can control at least one of the display system 350, the cargo system 355, the seat system 360 and the payment system 365 on the basis of electrical signals obtained by converting user inputs from a plurality of users.

10) Multimedia Content Provision Scenario for Multiple Users

A tenth scenario S120 is a multimedia content provision scenario for a plurality of users. The display system 350 can provide content that can be viewed by all users together. In this case, the display system 350 can individually provide the same sound to a plurality of users through speakers provided for respective seats. The display system 350 can provide content that can be individually viewed by a plurality of users. In this case, the display system 350 can provide individual sound through a speaker provided for each seat.

11) User Safety Secure Scenario

An eleventh scenario S121 is a user safety secure scenario. When information on an object around the vehicle which threatens a user is acquired, the main controller 370 can control an alarm with respect to the object around the vehicle to be output through the display system 350.

12) Personal Belongings Loss Prevention Scenario

A twelfth scenario S122 is a user's belongings loss prevention scenario. The main controller 370 can acquire data about user's belongings through the input device 310. The main controller 370 can acquire user motion data through the input device 310. The main controller 370 can determine whether the user exits the vehicle leaving the belongings in the vehicle on the basis of the data about the belongings and the motion data. The main controller 370 can control an alarm with respect to the belongings to be output through the display system 350.

13) Alighting Report Scenario

A thirteenth scenario S123 is an alighting report scenario. The main controller 370 can receive alighting data of a user through the input device 310. After the user exits the vehicle, the main controller 370 can provide report data according to alighting to a mobile terminal of the user through the communication device 330. The report data can include data about a total charge for using the vehicle 10.

Vehicle Clothing Management Device

Hereinafter, on the basis of the above-described contents, a vehicle clothing management device according to the present disclosure will be described in detail as follows.

Figure 8:
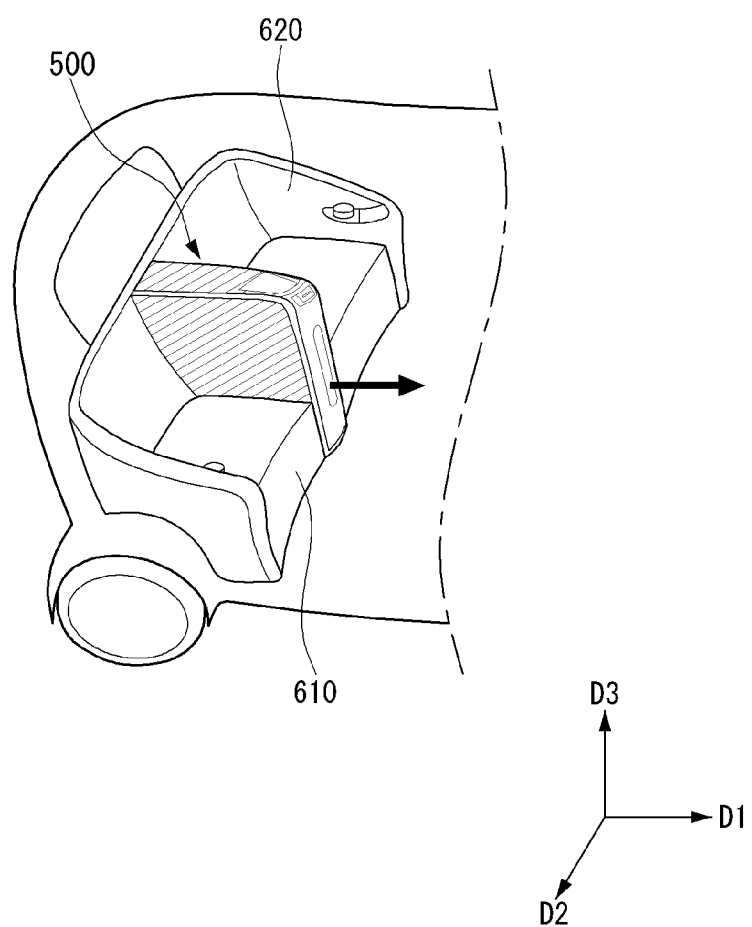
FIG. 8 is a view showing a state that a vehicle clothing management device of the present disclosure is installed inside the vehicle.

FIG. 8 is a view showing a state that a vehicle clothing management device of the present disclosure is installed inside the vehicle.

According to FIG. 8, the vehicle clothing management device 500 may be positioned between a first seat 610 and a second seat 620 of the vehicle. In this case, the first seat 610 and the second seat 620 may mean seats arranged side by side inside the vehicle.

The vehicle clothing management device 500 may be positioned in a space between the seats, as well as may be positioned in other spaces inside the vehicle. Specifically, the vehicle clothing management device 500 may be positioned in a door or a space between a front seat and a back seat of the vehicle.

The vehicle clothing management device 500 may be provided in large vehicles, such as buses, trailers, campers, as well as vehicles such as small cars and medium-sized cars.

According to FIG. 8, when the vehicle clothing management device 500 is positioned in the space between the first seat 610 and the second seat 620, the vehicle clothing management device 500 may be opened in a D1 direction. That is, it is common for a vehicle to have an empty space between a front seat and a back seat, and a door of the vehicle clothing management device 500 may utilize the empty space.

Accordingly, the vehicle clothing management device 500 has a width in the D1 direction greater than a width in a D2 direction, and the door of the vehicle clothing management device 500 may move in the D1 direction.

In addition, the vehicle clothing management device 500 may have a height in a D3 direction. When the vehicle clothing management device 500 is positioned in the space between the first seat 610 and the second seat 620, an upper surface of the vehicle clothing management device 500 may be positioned below headrests of the first seat 610 and the second seat 620. In addition, the height of the vehicle clothing management device 500 may be smaller than heights of the first seat 610 and the second seat 620.

In general, when there are two users in the vehicle, the first seat 610 and the second seat 620 may be boarded. In this case, in order to communicate between the users, it is preferable that the vehicle clothing management device 500 does not block the user's view.

Hereinafter, the vehicle clothing management device 500 of the present disclosure may include a premise that is provided inside the vehicle as shown in FIG. 8.

Figure 9:
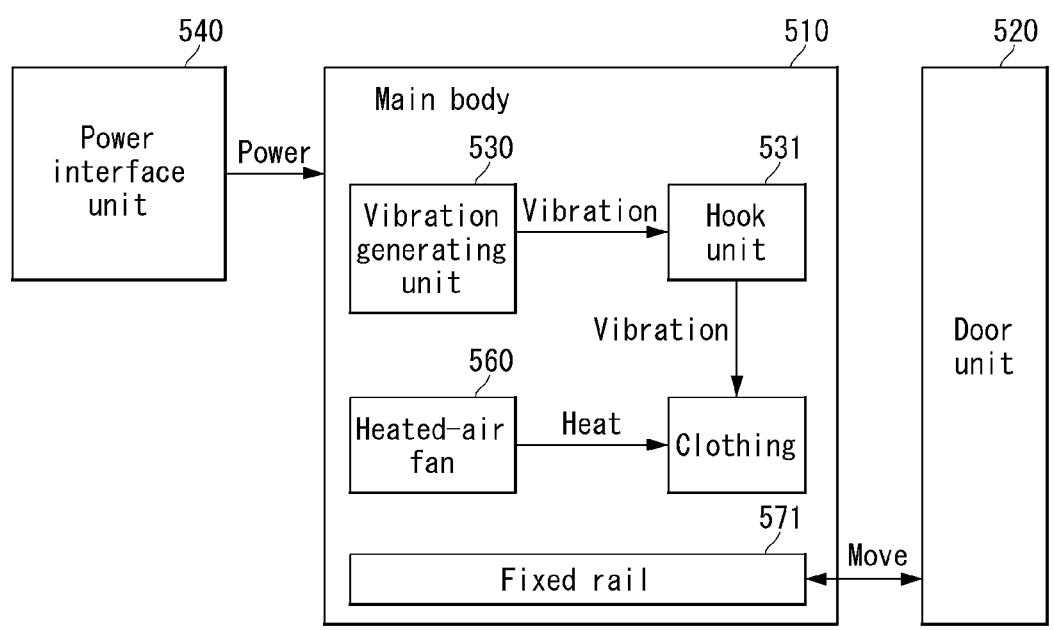
FIG. 9 is a block diagram showing a vehicle clothing management device according to the present disclosure.

FIG. 9 is a block diagram showing a vehicle clothing management device according to the present disclosure.

According to FIG. 9, the vehicle clothing management device 500 according to a first embodiment of the present disclosure may include a main body 510, a door unit 520, and a power interface unit 540. The power interface unit 540 may transmit power of the vehicle to each component of the main body 510.

According to FIG. 9, the main body 510 may include a vibration generating unit 530, a hook unit 531, a heated-air fan 560, and a fixed rail 571 therein. The vibration generating unit 530 may transmit vibration to the hook unit 531, and the hook unit 531 may transmit vibration to clothing. That is, the vibration generating unit 530 may generate the vibration transmitted to the clothing.

The heated-air fan 560 may transmit heat to the clothing. Due to the heat of the heated-air fan 560, the clothing may be dried. The heated-air fan 560 may transmit the heat by applying heated-air to the clothing.

The door unit 520 may be connected to the fixed rail 571 to move slidingly. The fixed rail 571 may be installed on one surface of the main body. The door unit 520 may move along the fixed rail 571.

Figure 10:
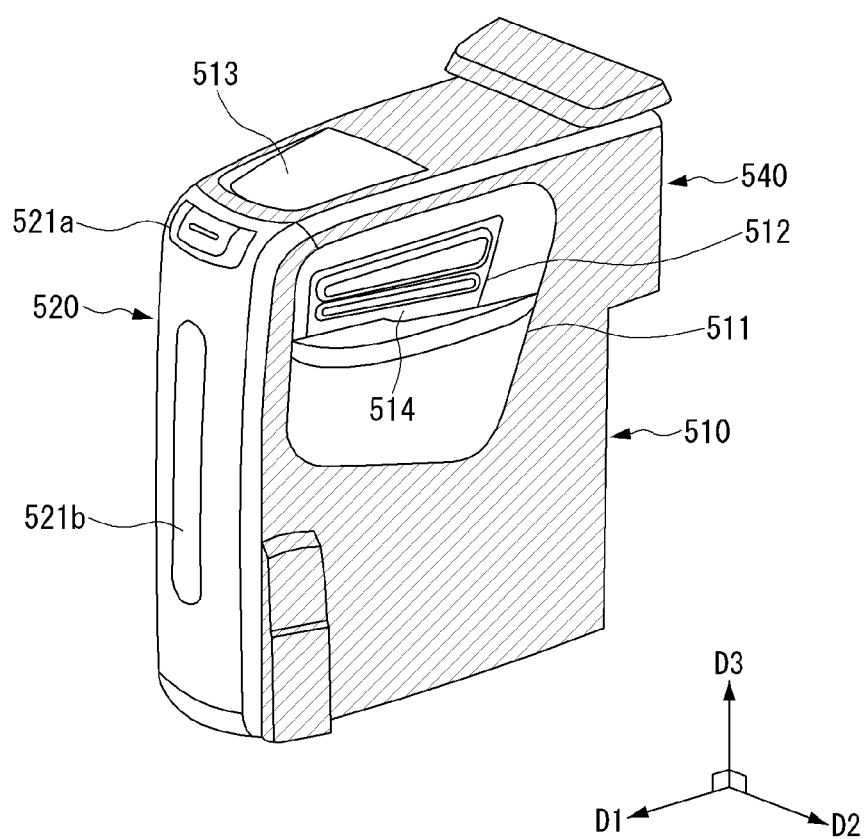
FIGS. 10 and 11 are perspective views illustrating a vehicle clothing management device according to the present disclosure.
Figure 11:
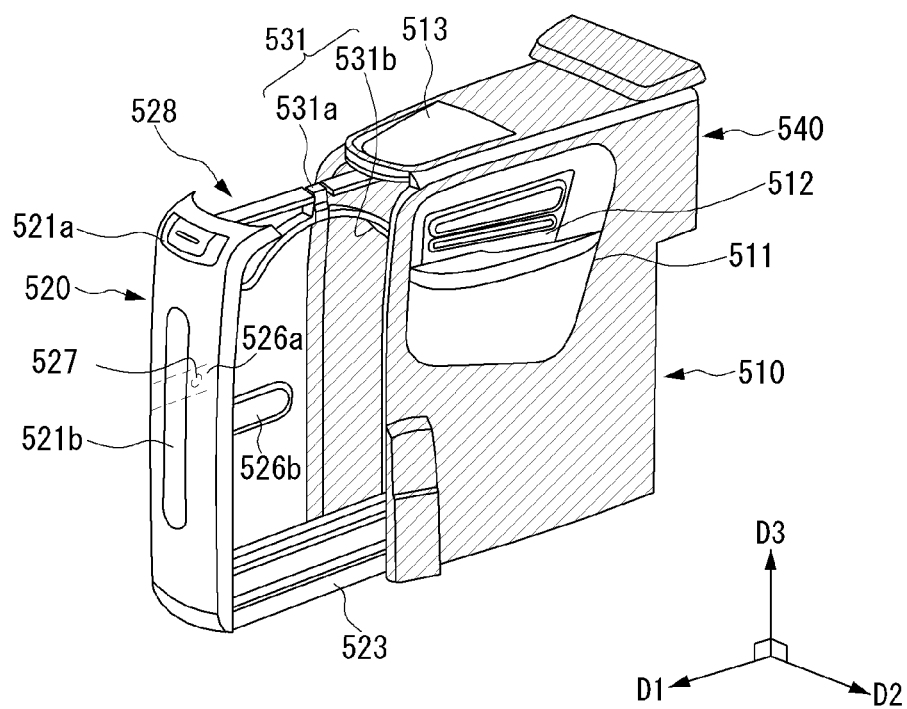

FIGS. 10 and 11 are perspective views illustrating a vehicle clothing management device according to the present disclosure.

According to FIG. 10, the vehicle clothing management device 500 according to a first embodiment of the present disclosure may include a main body 510, a door unit 520, and a power interface unit 540.

The main body 510 may be provided inside the vehicle and may store clothing, and the door unit 520 may open and close an open part of the main body 510. In addition, the power interface unit 540 may transmit power of the vehicle to the vibration generating unit 530. In addition, the power interface unit 540 may transmit the power of the vehicle to other components that require power of the vehicle.

In addition, the main body 510 may have one open surface. The one open surface of the main body 510 may be opened and closed by the door unit 520. The main body 510 may be provided inside the vehicle and may store the clothing.

According to FIG. 10, the main body 510 may include an armrest part 511, a storage part 512, and an external lighting 514 on one side. In addition, the main body 510 may include an item placing part 513 on the upper surface.

Figure 12:
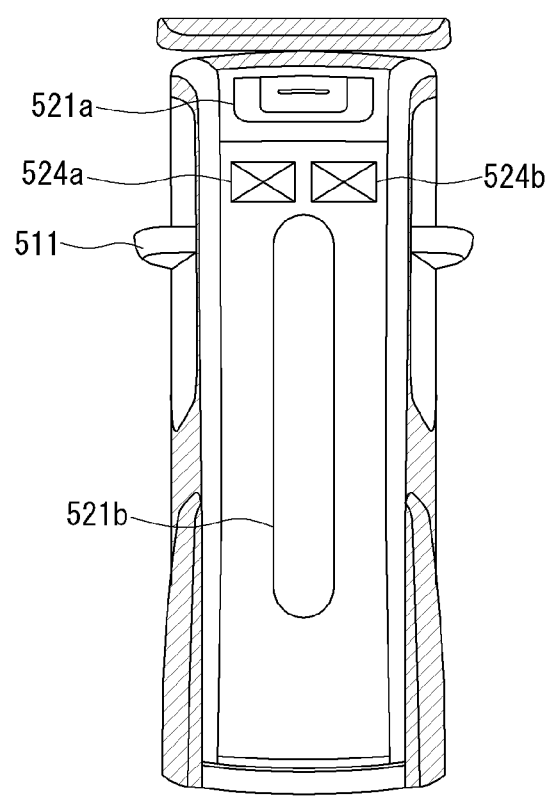
FIG. 12 is a front view showing a vehicle clothing management device according to the present disclosure.

When the vehicle clothing management device 500 is positioned in the space between the first seat 610 and the second seat 620, as shown in FIG. 12, the armrest part 511 is a configuration in which a user may place an arm.

The storage part 512 may be an empty space positioned between one side of the main body 510 and the armrest part 511. The storage part 512 may mean a space provided to store user's small items and the like.

The external lighting 514 may be positioned on one side of the main body 510 to illuminate the interior space of the vehicle. The external lighting 514 not only gives an aesthetic sense to the user, but also allows the user to identify the vehicle clothing management device 500 in a dark vehicle interior.

The item placing part 513 may mean a groove dug in the upper surface of the main body 510. Inside a top plate of the main body 510 where the item placing part 513 is positioned, a coil (not shown) for wireless charging may be further included. When a device supporting wireless charging is mounted on the item placing part 513, power may be wirelessly supplied through the coil.

The main body 510 may include a width in the D1 direction, a width in the D2 direction, and a height in the D3 direction. The width in the D1 direction may be greater than the width in the D2 direction. The power interface unit 540 for transmitting power or the like may be positioned on the back of the main body 510.

The main body 510 may include a space inside. The clothing may be stored in the inner space of the main body 510, and devices for movement of the door unit 520 may be provided in the inner space of the main body 510.

The door unit 520 may further include an indicator 521a and a window 521b.

The indicator 521a is a configuration that informs a clothing management state to the outside. The indicator 521a may include a display. The user may know the clothing management state through a type of light, an intensity of light, and a color or pattern of light displayed on the indicator 521a.

According to FIG. 11, the vehicle clothing management device 500 with the door unit 520 open may include a storage space in which the clothing may be stored. In addition, the vehicle clothing management device 500 may further include the hook unit 531 for hanging clothing. The hook unit 531 may be configured to receive clothing inside the main body 510. The hook unit 531 may have a hanger shape.

The hook unit 531 may include a fastening part 531a that can be fastened or detachable with the door arm 528, and a supporting part 531b that supports for hanging clothing. The supporting part 531b may be connected to the fastening part 531a and may be configured to support the clothing inside. As shown in FIG. 10, the supporting part 531b may have a curved shape with both ends facing downward. Further, the supporting part 531b may have a rod shape that is not curved and extends in a straight line, but the shape of the supporting part 531b is not limited to this example.

The vehicle clothing management device 500 according to the present disclosure may generate vibration and transmit it to the hook unit 531. Accordingly, vehicle clothing management device 500 may transmit vibration to the clothing caught in the hook unit 531, and shake off foreign matter such as dust on the surface of the clothing by the transmitted vibration.

According to FIG. 11, the door unit 520 may include at least one guide unit 526. In addition, the guide unit 526 may be connected to one end of the door unit 520. In addition, according to FIG. 11, the door unit 520 may include two guide units 526a and 526b, and the two guide units 526a and 526b may be connected to both side ends of the door unit 520, respectively. In addition, according to FIG. 11, a sensing unit 527 may be installed on inner surfaces of the guide units 526a and 526b.

The sensing unit 527 may be configured to sense a fiber type of clothing. The sensing unit 527 may be a camera for utilizing vision recognition. When the sensing unit 527 is a camera, the sensing unit 527 may include a lens, an image sensor, an aperture, and the like. Since the lens may be damaged by the movement of the clothing, a protective glass capable of protecting the lens may be installed outside the lens.

According to FIGS. 10 and 11, the vehicle clothing management device 500 according to the present disclosure may include a first state in which the door unit 520 is open, and a second state in which the door unit 520 is closed. The state may be changed by the user's command input. That is, when the user inputs a close command in the first state, it may be changed to the second state, and when the user inputs an open command in the second state, it may be changed to the first state.

In addition, when the user is in front of the vehicle clothing management device 500, the second state may be changed to the first state. In addition, when the user hangs the clothing on the hook unit 531 and fastens the hook unit 531 to the door arm 528, the first state may be changed to the second state. In addition, when driving of the vehicle clothing management device 500 is finished, the second state may be changed to the first state. In addition, when an emergency situation occurs while driving the vehicle clothing management device 500 or an autonomous vehicle arrives at the destination, the second state may be changed to the first state.

FIG. 12 is a front view showing a vehicle clothing management device according to the present disclosure.

According to FIG. 12, the vehicle clothing management device 500 may further include a vision recognition camera 524a and/or a voice recognition microphone 524b as well as the indicator 521a, the armrest part 511, the window 521b. The vision recognition camera 524a may recognize a user's appearance and the like positioned around the vehicle clothing management device 500, and the voice recognition microphone 524b may recognize a user's voice or the like positioned around the vehicle clothing management device 500.

The armrest part 511 may be positioned on both sides of the vehicle clothing management device 500, and the window 521b may be positioned on one surface of the exterior of the vehicle clothing management device 500. Although the vision recognition camera 524a and the voice recognition microphone 524b are shown in the front in FIG. 12, these position features are only an example and do not limit the scope of the present disclosure.

In addition, the indicator 521a may include a fingerprint recognition sensor. Accordingly, when the user touches a specific finger on the fingerprint recognition sensor, fingerprint information may be input to the fingerprint recognition sensor. It may be possible to confirm the user's identity based on the input fingerprint information.

In addition, a command may be input to the vehicle clothing management device through a touch sensor, a switch, and the like included in the indicator 521a. At this time, the switch may input a command for opening and closing the door unit 520.

A detailed example of opening the door 520 will be described.

For example, the door unit 520 may be opened when a vehicle 600 is stopping.

For example, the door unit 520 may be opened when the vehicle 600 is driving at a certain speed or less even when the vehicle 600 is driving. If a speed of the vehicle 600 is less than 20 km/h, which is a speed that can be felt as slow, the door unit 520 may be opened even while driving by a user's command.

For example, even when the vehicle 600 is driving, the door unit 520 may be opened by the door unit 520 opening command when the degree of curvature of the driving road is equal to or less than a certain angle. This is because it may be dangerous if the user uses the vehicle clothing management device 500 when the vehicle 600 is driving on a curved road. However, if the degree of curvature of the road is less than 15 degrees, the door unit 520 may be opened by a user's open command.

For example, even when the vehicle 600 is driving, the door unit 520 may be opened when the road surface condition of the driving road is even. This is because it may be dangerous if the user uses the vehicle clothing management device 500 when the vehicle 600 is driving on a road having bad road conditions. However, when the amplitude of vibration of the vehicle 600 according to the road surface condition is less than 3 cm, the door unit 520 may be opened.

However, the above figures are only examples and do not limit the scope of the present disclosure.

The window 521b may include a transparent material so that the user can directly see the inside of the vehicle clothing management device 500. Also, the window 521b may include a transparent display. Accordingly, the window 521b may display advertisements, UIs, icons, images, and the like. Since the window 521b includes the transparent display, the user can observe the inside of the vehicle clothing management device 500.

In addition, since the window 521b includes the transparent display, the window 521b may have an opaque color, a colored color, or a transparent color according to specific conditions. When the window 521b has the transparent color, the inside of the vehicle clothing management device 500 may be observed from the outside. When the window 521b is opaque or colored, the inside of the vehicle clothing management device 500 cannot be observed from the outside.

A specific example in which the window 521b has the transparent color will be described.

As an example, the vision recognition camera 524a may sense that the user's gaze is toward the window 521b. When the vision recognition camera 524a detects the user's gaze, the window 521b may change from opaque or colored to transparent. In this way, it is possible to control such that the inside of the vehicle clothing management device 500 can be observed according to the user's gaze. However, at this time, it is preferable that the user is a person who has the authority to use the vehicle clothing management device 500.

For example, when the vehicle clothing management device 500 is operated by a user who has the authority to use, the window 521b may change from opaque or colored to transparent.

For example, when the vehicle clothing management device 500 starts an operation of managing clothing, the window 521b may change from the opaque color or the colored color to the transparent color. In addition, when the vehicle clothing management device 500 ends the operation of managing clothing, the window 521b may change from the opaque color or the colored color to the transparent color.

In addition, the voice recognition microphone 524b may be configured to input a user's voice or the like, and the vision recognition camera 524a may be configured to recognize a user's face, appearance, or behavior. In addition, the vision recognition camera 524a may confirm the user's identity by recognizing the user's iris.

Figure 13:
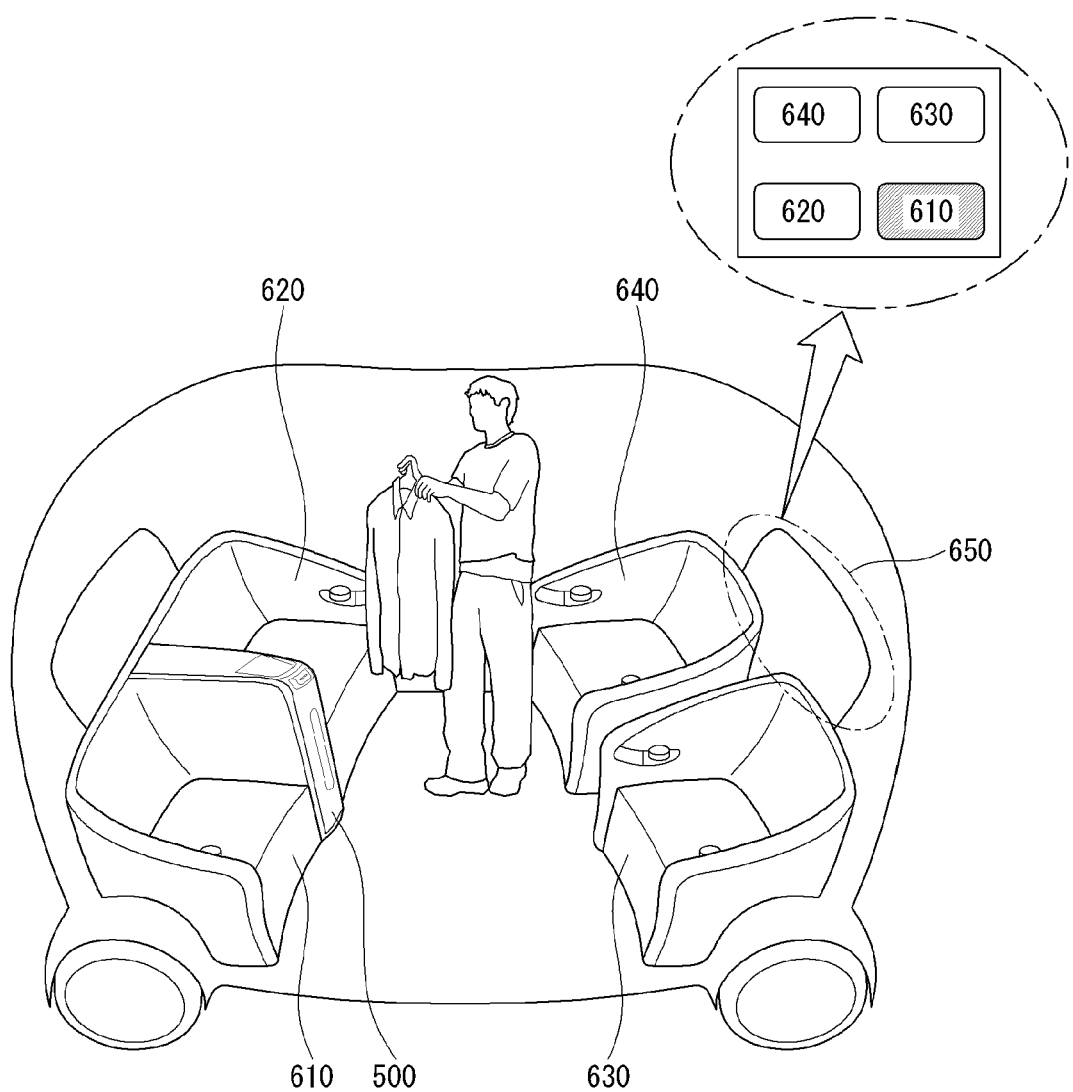
FIGS. 13 and 14 are views illustrating an example in which a vehicle clothing management device according to the present disclosure is installed.
Figure 14:
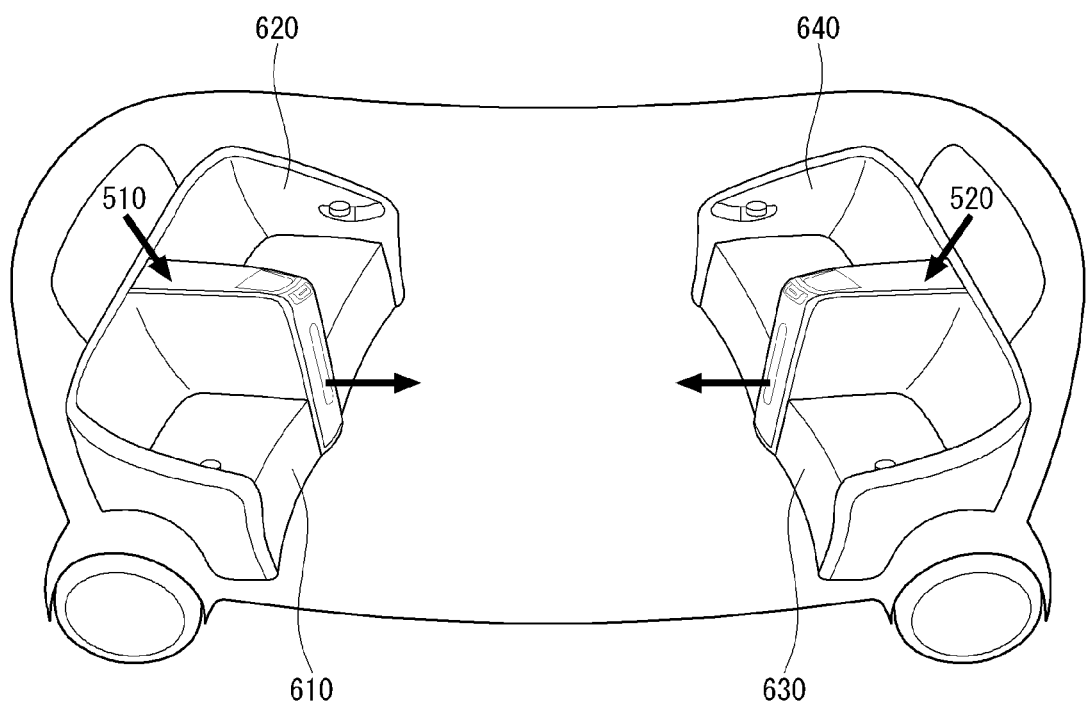

FIGS. 13 and 14 are views illustrating an example in which a vehicle clothing management device according to the present disclosure is installed.

According to FIG. 13, a display 650 displaying information related to the vehicle clothing management device 500 may be installed in the vehicle 600 according to a first embodiment of the present disclosure.

The display 650 may be implemented with a light emitting diode (LED), an organic LED (OLED), a luminescent polymer (LEP) or a polymer LED (PLED), a liquid crystal display (LCD), a thin film transistor (TFT) LCD, a plasma, an electronic paper, an electronic ink, or a combination thereof.

In addition, the display 650 may include a touch panel so that the user (or driver) may input a command through the display 650. At this time, a user interface for controlling the vehicle clothing management device 500 may be displayed on the display 650.

In addition, the display 650, as well as the second display device 420 included in the display system 350 of FIG. 5 may also include a touch panel, so that the user may input a command through the second display device 420. At this time, a user interface for controlling the vehicle clothing management device 500 may be displayed on the second display device 420.

In addition, the display 650 included in the vehicle 600 may indicate whether a passenger who has reserved which seat in the vehicle 600 uses the vehicle clothing management device 500.

According to FIG. 13, the display 650 may display a first seat 610 to a fourth seat 640, and among them, information indicating that a passenger of the first seat 610 is currently using the vehicle clothing management device 500 is displayed on the display 650.

In addition, the display 650 may display information about whether another passenger has reserved the use of the vehicle clothing management device 500 after the passenger who currently uses the vehicle clothing management device 500.

In addition, the display 650 may be installed opposite the vehicle clothing management device 500. This is because a seat may be allocated so that a user of the vehicle clothing management device 500 can sit in a seat around the vehicle clothing management device 500.

According to FIG. 14, a plurality of vehicle clothing management devices 500 according to the first embodiment of the present disclosure may be installed in the vehicle 600.

At this time, a first vehicle clothing management device 510 may be positioned between the first seat 610 and the second seat 620 of the vehicle 600. At this time, the first seat 610 and the second seat 620 may mean seats arranged side by side inside the vehicle 600.

In addition, a second vehicle clothing management device 520 may be positioned between the third seat 630 and the fourth seat 640 of the vehicle 600. At this time, the third seat 630 and the fourth seat 640 may mean seats arranged side by side inside the vehicle 600.

Method for Providing Clothing Management Service

Hereinafter, a method for providing clothing management service according to a preferred second embodiment of the present disclosure based on the above-described contents will be described in detail as follows.

Hereinafter, the same or overlapping contents as the above-described first embodiment among the descriptions of the method for providing clothing management service according to the preferred second embodiment of the present disclosure will be omitted, and the description will be mainly focused on different points.

FIGS. 15 to 18 are views showing a method for providing clothing management service according to a second embodiment of the present disclosure.

Figure 15:
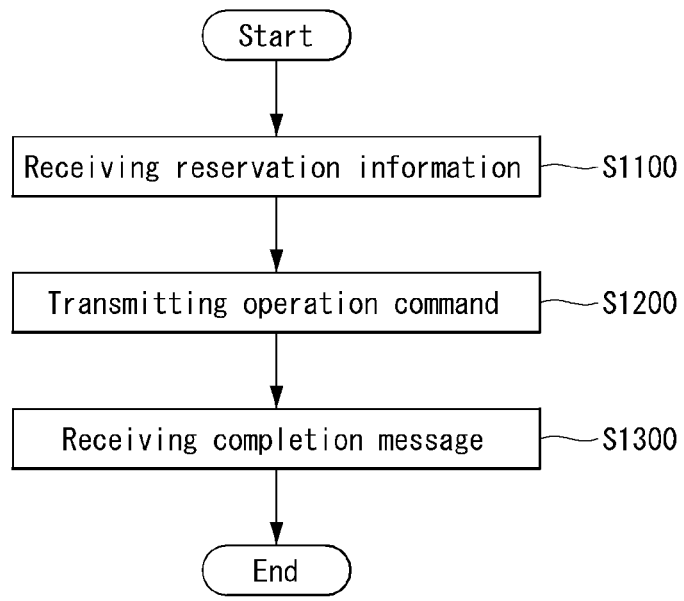
FIGS. 15 to 18 are views showing a method for providing clothing management service according to a second embodiment of the present disclosure.

According to FIG. 15, a method for providing clothing management service according to a second embodiment of the present disclosure may include receiving reservation information for the clothing management service from a user terminal 700 (S1100), transmitting an operation command according to the received reservation information to a shared vehicle 600 (S1200), and receiving a completion message according to the operation command from the shared vehicle 600 (S1300).

The shared vehicle 600 may be for a large number of users. Therefore, a user who wants to use the shared vehicle 600 may reserve the service. Through the reservation, the user may be provided with services so as not to overlap with the usage time of other users.

Figure 16:
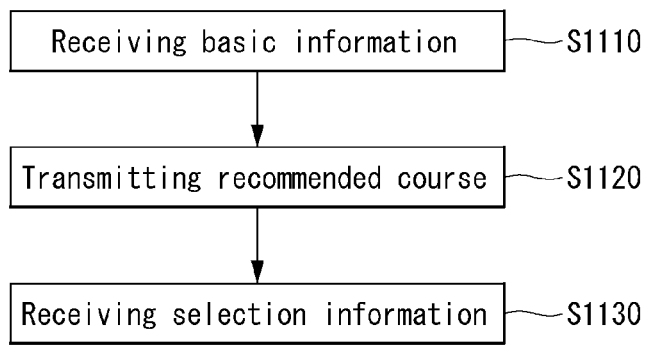

According to FIG. 16, the receiving the reservation information (S1100) may include receiving basic information for providing clothing management service (S1110), transmitting a recommended course generated based on the received basic information (S1120) and receiving selection information for selecting the recommended course from the user terminal 700 (S1130).

The reservation information may include the basic information and the selection information for selecting the recommended course. The basic information may include all information that the user inputs in advance to receive the clothing management service. Specifically, the basic information may include a user's destination, waypoint, departure time, arrival time, and user identity information. The user terminal 700 device such as a smart phone, a computer, and a laptop may obtain the basic information from the user.

The recommended course may refer to an optimal clothing management course generated according to the basic information input by the user.

Figure 17:
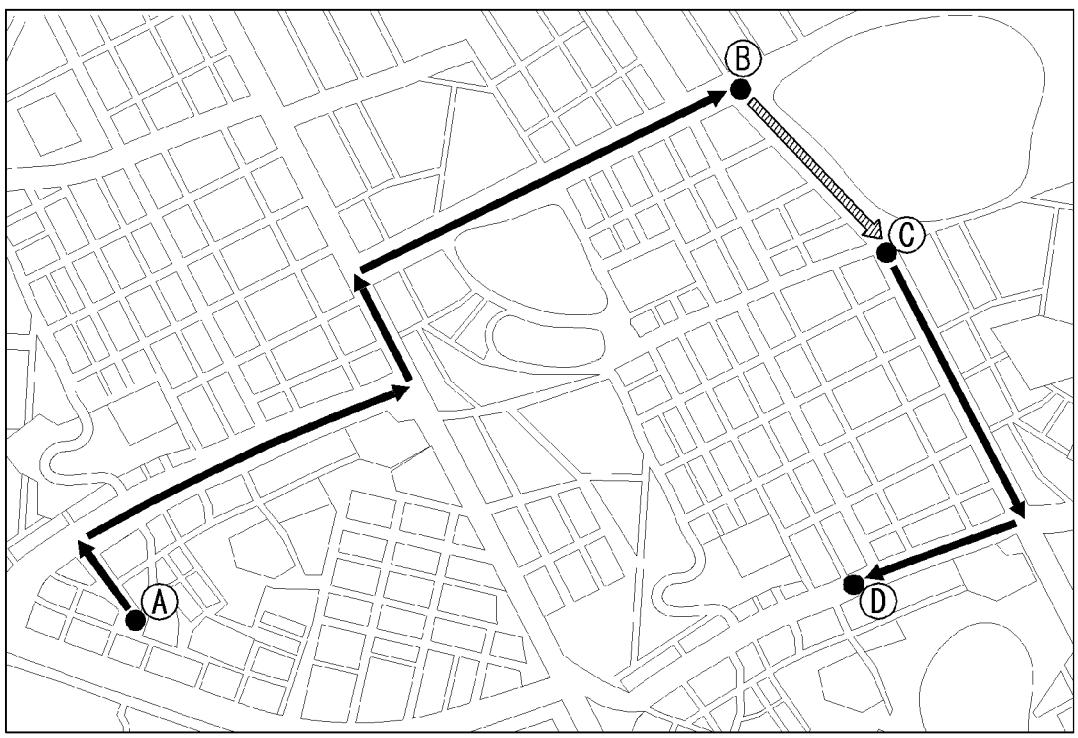

According to FIG. 17, the recommended course may be generated based on an estimated time to arrive at the input destination. That is, it is preferable that the recommended course is a course that operates for a shorter time than the estimated time to arrive at the input destination.

According to FIG. 17, a first user may use a first terminal 710. The first user may input a departure point as place A and an arrival point as place B in the first terminal 710. In addition, the first user may input departure time from the departure point as 1.00 pm. At this time, the departure point, the arrival point and the departure time may be included in basic information. As described above, it is possible to calculate time required for driving from the place A to the place B based on the basic information. In order to calculate the time required, it may be calculated based on real-time traffic information.

It was expected to take about 35 minutes as a result of calculating the time required based on the input basic information. Therefore, a first course that can manage clothing for 35 minutes may be recommended. The first course may be a course for managing clothing of the first user for less than 35 minutes. Also, the first course may include a plurality of recommended courses. The first user may select one of the plurality of recommended courses.

According to FIG. 17, a second user may use a second terminal 720. The second user may input a departure point as place C and an arrival point as place D in the second terminal 720. In addition, the second user may input departure time from the departure point as 1.45 pm. At this time, the departure point, the arrival point and the departure time may be included in basic information. As described above, it is possible to calculate time required for driving from the place C to the place D based on the basic information. In order to calculate the time required, it may be calculated based on real-time traffic information.

It was expected to take about 15 minutes as a result of calculating the time required based on the input basic information. Therefore, a second course that can manage clothing for 15 minutes may be recommended. The second course may be a course for managing clothing of the second user for less than 15 minutes. Also, the second course may include a plurality of recommended courses. The second user may select one of the plurality of recommended courses.

As an example, since the estimated time of the second user is shorter than the estimated time of the first user, the second course may include a set value that generates a vibration of a stronger intensity or injects air of a stronger pressure than the first course.

However, since the place and time described in FIG. 17 are only examples, the scope of the present disclosure is not limited.

Figure 18:
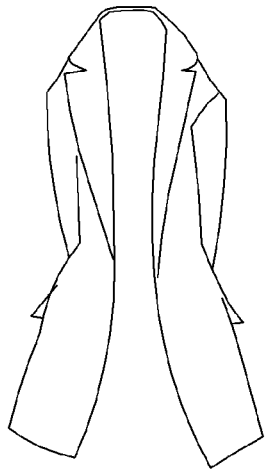
Figure 18:
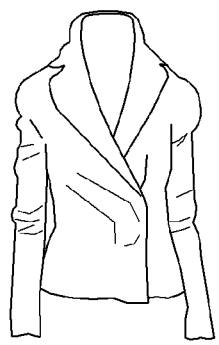

According to FIG. 18, a recommended course may be generated based on information on clothing that a user wants to receive clothing management service.

According to FIG. 18, the first terminal 710 used by the first user may obtain information about clothing from the first user. That is, clothing information that the first user's clothing is a coat and its material is cotton may be obtained by the first terminal 710.

In addition, according to the embodiment according to FIG. 17, the estimated time required was calculated based on the departure point, the arrival point and the departure time. At this time, the clothing type and the clothing material may be included in the basic information. As such, a third course may be recommended based on the basic information. The third course may be a course for managing clothing of the first user for less than 35 minutes. Also, the first course may include a plurality of recommended courses. One course may be selected from the plurality of recommended courses.

According to FIG. 18, the second terminal 720 used by the second user may obtain information that the type of clothing is a jacket and its material is leather.

In addition, according to the embodiment according to FIG. 17, the estimated time required may be calculated based on the departure point, the arrival point and the departure time. At this time, the clothing type and the clothing material may be included in the basic information.

As such, a fourth course may be recommended based on the basic information. The fourth course may be a course for managing clothing of the second user for less than 15 minutes. Also, the fourth course may include a plurality of recommended courses. One of the plurality of recommended courses may be selected by the second user.

For example, since the clothing of the second user is a material weaker to heat than the clothing of the first user, the fourth course may include a set value that generates a temperature lower than that of the third course.

For example, the temperature may be set in consideration of the internal temperature of the shared vehicle 600 or the external temperature of the shared vehicle 600 as well as the material of the user's clothing.

However, the recommended course and the estimated time required for each clothing described in FIG. 18 are only examples, and do not limit the scope of the present disclosure.

Figure 19:
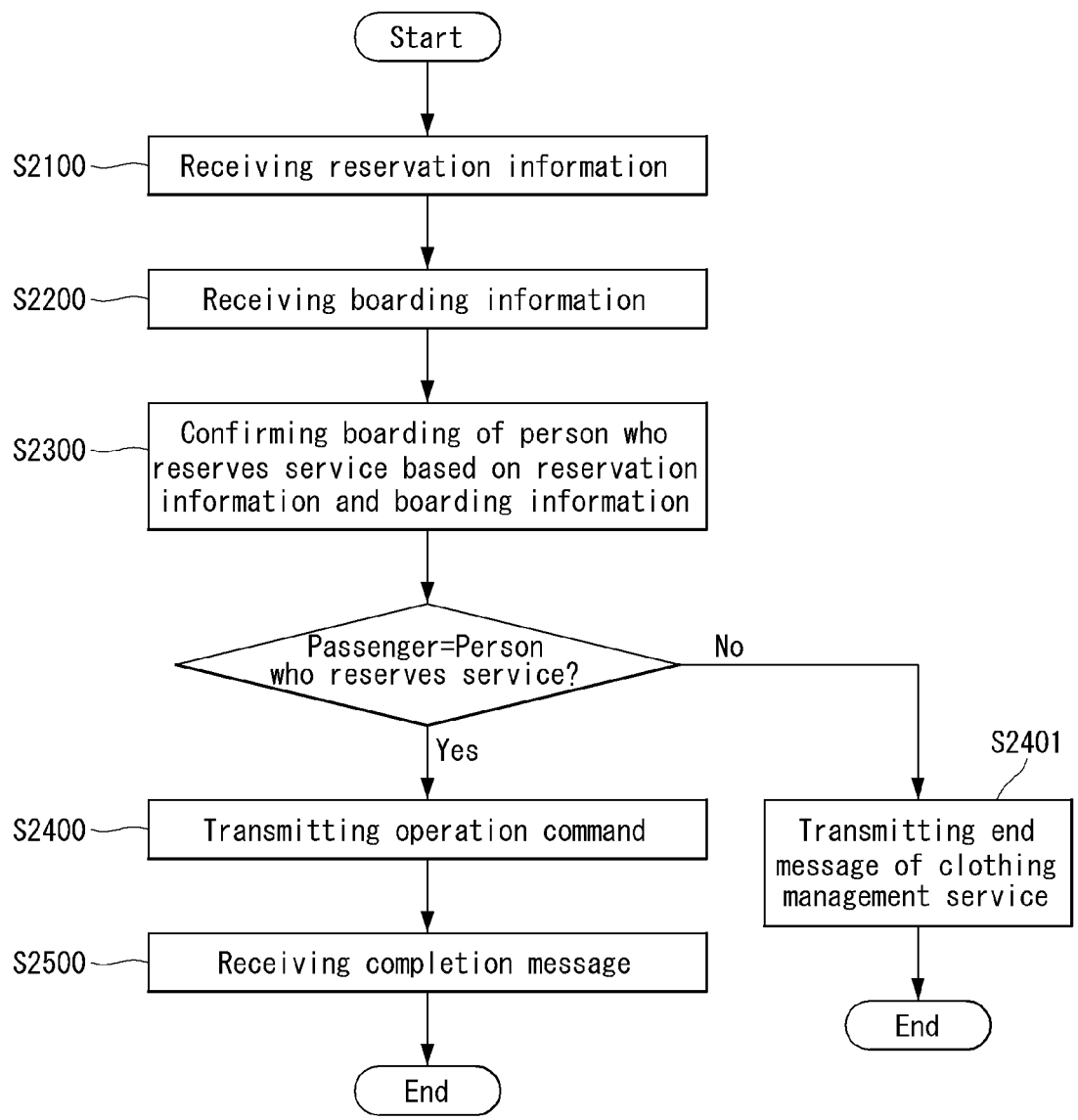
FIG. 19 is a view showing a method for providing clothing management service according to a second embodiment of the present disclosure.

FIG. 19 is a view showing a method for providing clothing management service according to a second embodiment of the present disclosure.

According to FIG. 19, a method for providing clothing management service according to the second embodiment of the present disclosure may include receiving reservation information for providing clothing management service from the user terminal 700 (S2100), receiving boarding information of the passenger from the shared vehicle 600 (S2200), confirming boarding of a person who reserves the service based on the received reservation information and boarding information (S2300)

In addition, according to FIG. 19, the method for providing clothing management service according to the second embodiment of the present disclosure may further include transmitting an operation command to the shared vehicle 600 when the passenger and the person who reserves the service are the same (S2400) and receiving a completion message according to the operation command from the shared vehicle 600 (S2500).

In addition, according to FIG. 19, the method for providing clothing management service according to the second embodiment of the present disclosure may further include transmitting an end message of the clothing management service without transmitting the operation command to the shared vehicle 600 when the passenger and the person who reserves the service are not the same (S2401).

That is, after confirming that the person who reserves the service and the passenger are the same person, it is possible to provide the clothing management service. This is because the service should be provided only to the person who reserves the service since the shared vehicle 600 can be used by a large number of users.

Examples of how to confirm that the person who reserves the service and the passenger is the same person are as follows.

When receiving basic information from the user, the basic information may include identification information of the person who reserves the clothing management service. The identification information of the person who reserves the service may include information such as name, age, gender, social security number, unique ID, and identification number of the person who reserves the service. Further, the identification information of the person who reserves the service may include face information, voice information, fingerprint information, iris information, and the like of the person who reserves the service.

When the passenger boards the shared vehicle 600, the shared vehicle 600 may obtain passenger recognition information. The passenger recognition information may include passenger identification information. The identification information of the passenger may include information such as name, age, gender, social security number, unique ID, and identification number of the passenger. Further, the identification information of the passenger may include face information, voice information, fingerprint information, iris information, and the like of the passenger.

Accordingly, matching information is generated by comparing the obtained passenger recognition information with the input identification information of the person who reserves the service, and the generated matching information may be transmitted to the shared vehicle 600. That is, the matching information may include information of the same person as a result of matching the identification information of the passenger with the identification information of the person who reserves the service.

The face information of the passenger may be obtained from a camera included in the shared vehicle 600 or a camera provided in the vehicle clothing management device 500. The feature points of the passenger's face may be set from image data of the passenger's face, and when position coordinates of the set feature points are analyzed, it may be compared with the face information of the person who reserves the service.

The voice information of the passenger may be obtained from a microphone included in the shared vehicle 600 or a microphone provided in the vehicle clothing management device 500. The feature points of the passenger's voice waveform may be set from voice data of the passenger's voice, and when distribution of the set feature points is analyzed, it may be compared with the voice information of the person who reserves the service.

The fingerprint information of the passenger may be obtained from a fingerprint sensor included in the shared vehicle 600 or a fingerprint sensor provided in the vehicle clothing management device 500. The feature points of the passenger's fingerprint may be set from image data of the passenger's fingerprint, and when distribution of the set feature points is analyzed, it may be compared with the fingerprint information of the person who reserves the service.

The iris information of the passenger may be obtained from a camera included in the shared vehicle 600 or a camera provided in the vehicle clothing management device 500. The feature points of the passenger's iris may be set from image data of the passenger's iris, and when distribution of the set feature points is analyzed, it may be compared with the iris information of the person who reserves the service.

As described above, by using face information, voice information, fingerprint information, iris information, etc., matching information matching the passenger and the person who reserves the service is obtained, and the obtained matching information may be transmitted to the shared vehicle 600.

Figure 20:
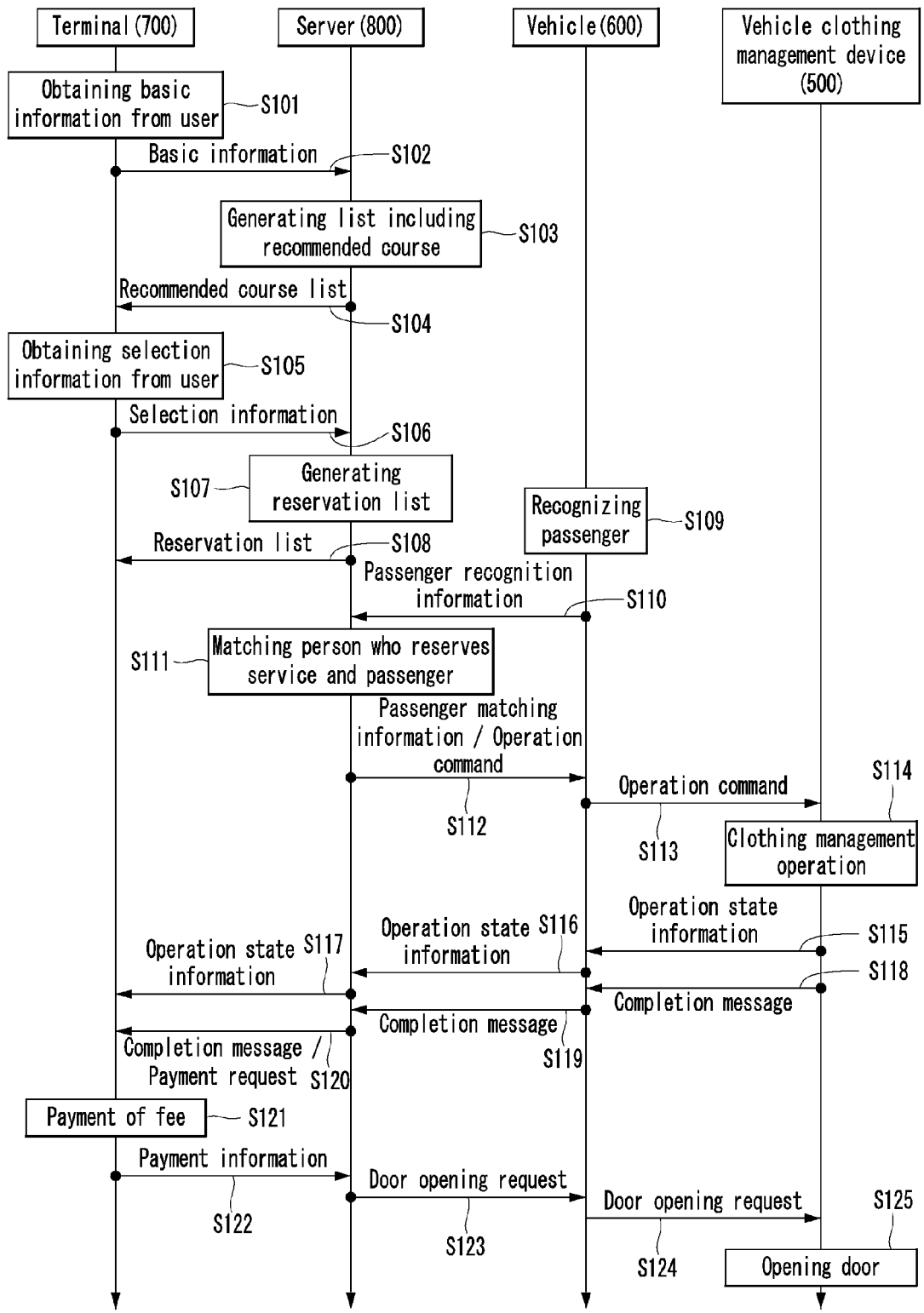
FIG. 20 is a view showing a specific method for providing clothing management service according to a second embodiment of the present disclosure.

FIG. 20 is a view showing a specific method for providing clothing management service according to a second embodiment of the present disclosure.

According to FIG. 20, steps in the terminal 700, a server 800, the vehicle 600, and the vehicle clothing management device 500 are shown.

The terminal 700 may obtain basic information from the user (S101), and transmit the obtained basic information to the server 800 (S102). The server 800 may generate a list including a recommended course or a plurality of recommended courses based on the basic information (S103), and transmit the generated recommended course list to the terminal 700 (S104).

In addition, when the user selects a recommended course from the recommended course list, the terminal 700 may obtain selection information from the user (S105), and the terminal 700 may transmit the selection information to the server 800 (S106). The server 800 may generate a reservation list based on the received selection information (S107). The reservation list may include information about a person who reserves the service, a reservation time, a reservation ranking, and a selected course. The server 800 may transmit the generated reservation list to the terminal 700 (S108).

According to FIG. 20, the vehicle 600 may mean a shared vehicle, and the vehicle 600 may recognize a passenger who has boarded the vehicle (S109). That is, the vehicle 600 may obtain passenger recognition data. The passenger recognition method is the same as or overlapped with that described in FIG. 19, and thus is omitted.

The server 800 may transmit passenger recognition information to the server 800 (S110). The server 800 may match the person who reserves the service and the passenger based on the received passenger recognition information and basic information (S111). As a result of the matching, the server 800 may transmit matching information that the person who reserves the service and the passenger are the same to the vehicle 600, and the server 800 may transmit an operation command according to the course included in the reservation list to the vehicle 600 (S112).

The vehicle 600 may transmit the received operation command to the vehicle clothing management device 500 (S113). The vehicle clothing management device 500 may perform a clothing management operation according to the operation command (S114). At this time, the vehicle clothing management device 500 may transmit operation state information indicating a current operation state to the vehicle 600 (S115), and the vehicle 600 may transmit the operation state information to the server 800 (S116). The server 800 may transmit the received operation state information to the user's terminal 700 (S117).

The vehicle clothing management device 500 may transmit a completion message to the vehicle 600 when the clothing management operation is completed (S118). The vehicle 600 may transmit the completion message to the server 800 (S119), and the server 800 may request a payment for service provision while transmitting the completion message to the terminal 700 (S121). However, as shown in FIG. 17, etc., the estimated time and course may be set in the reservation process, so the payment may be made in a pre-paid manner in the reservation process.

The terminal 700 may transmit payment information to the server 800 after the payment of the fee (S122). The server 800 may check the payment information, and transmit a request to open a closed door of the clothing management device 500 to the vehicle 600 (S123). The vehicle 600 may transmit the door opening request to the vehicle clothing management device 500 (S124), and the vehicle clothing management device 500 may open the door (S125).

However, although FIG. 20 describes the vehicle 600 and the vehicle clothing management device 500 in a separate manner, the vehicle clothing management device 500 may directly communicate with the server 800 in some cases. In this case, the role of the vehicle 600 may be replaced by the vehicle clothing management device 500.

An example in which a plurality of users use the vehicle clothing management device 500 will be described.

For example, a passenger X who has an authority to use the vehicle clothing management device 500 may transfer the authority to a passenger Y who does not have the authority. That is, the authority to use the vehicle clothing management device 500 may be transferred to another person or another terminal.

For example, when a specific voice command is input to the microphone included in the vehicle 600 or the vehicle clothing management device 500, the authority to use the vehicle clothing management device 500 may be transferred. If the X having the authority to use says, "Please allow Y to take out clothes", the sentence may be input through the microphone installed in the vehicle clothing management device 500 or the vehicle 600. The input sentence may be transmitted to the server 800. The server 800 may analyze the input sentence, and the server 800 may transfer the authority to use the vehicle clothing management device 500 to Y according to the analysis result.

For example, the server 800 may receive a request for authority transfer through the terminal 700 of X having the authority to use. Upon the request, the authority granted to X may be transferred to Y.

Figure 21:
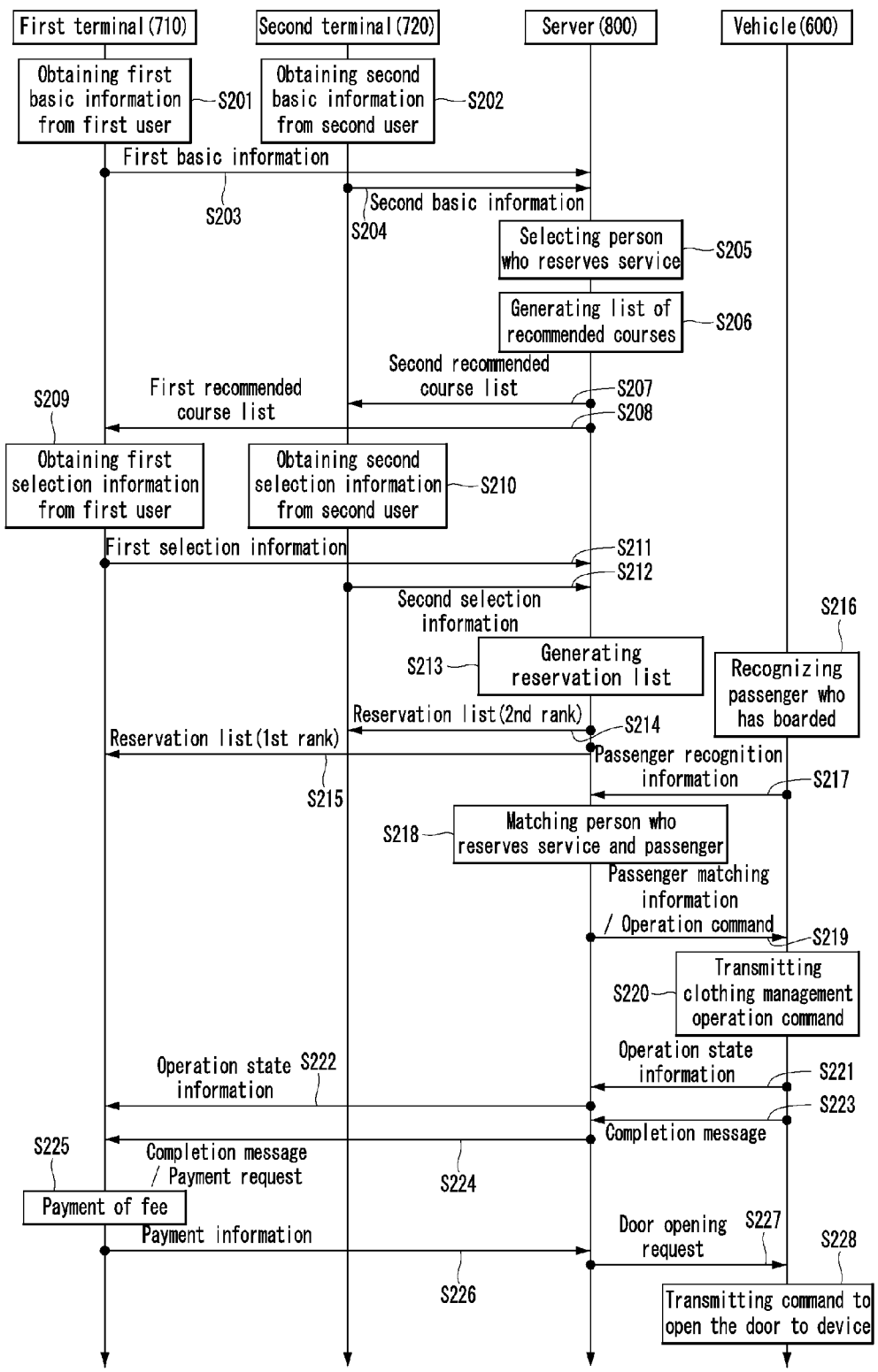
FIG. 21 is a view showing a specific method for providing clothing management service according to a second embodiment of the present disclosure.

FIG. 21 is a view showing a specific method for providing clothing management service according to a second embodiment of the present disclosure. According to FIG. 21, steps in the first terminal 710, the second terminal 720, the server 800, and the vehicle 600 are shown.

The first terminal 710 may obtain first basic information from the first user (S201), and the second terminal 720 may obtain second basic information from the second user (S202). The first terminal 710 may transmit the obtained first basic information to the server 800 (S203), and the second terminal 720 may transmit the obtained second basic information to the server 800 (S204). The server 800 may select a person who reserves the service based on the order of reaching the server 800 first among the first basic information and the second basic information (S205), generate a list of recommended courses for each person who reserves the service (S206), transmit the generated first recommended course list to the first terminal 710 (S208), and transmit the generated second recommended course list to the second terminal 720 (S207).

The first terminal 710 may obtain first selection information from the first user according to the first recommended course list, and the second terminal 720 may obtain second selection information from the second user according to the second recommended course list (S209, S210). The first terminal 710 may transmit the first selection information to the server 800, and the second terminal 720 may transmit the second selection information to the server 800 (S211, S212). The server 800 may generate a reservation list based on the received first selection information and second selection information (S213). The reservation list may include information about a person who reserves the service, a reservation time, a reservation ranking, and a selected course. The server 800 may transmit the generated reservation list to the first terminal 710 and the second terminal 720 (S214, S215).

At this time, a standby number is assigned to the second terminal 720, so that the second terminal 720 may maintain a priority even if a reservation request comes in from another terminal in the future.

According to FIG. 21, the vehicle 600 may mean a shared vehicle, and the vehicle 600 may recognize a passenger who has boarded the vehicle (S216). That is, the vehicle 600 may obtain passenger recognition data. The passenger recognition method is the same as or overlapped with that described in FIG. 19, and thus is omitted.

The server 800 may transmit passenger recognition information to the server 800 (S217). The server 800 may match the person who reserves the service and the passenger based on the received passenger recognition information and basic information (S218). As a result of the matching, the server 800 may transmit matching information that the person who reserves the service and the passenger are the same to the vehicle 600, and the server 800 may transmit an operation command according to a course included in the reservation list to the vehicle 600 (S219).

The vehicle 600 may transmit the received operation command to the vehicle clothing management device 500 (S220). The vehicle clothing management device 500 may perform a clothing management operation according to the operation command, and the vehicle may transmit the performed clothing management operation state information to the server 800 (S221). The server 800 may transmit the received operation state information to the first terminal 710 of the first user (S222).

When the clothing management operation is completed, the vehicle clothing management device 500 may transmit a completion message to the vehicle 600, and the vehicle 600 may transmit the completion message to the server 800 (S223). The server 800 may request payment of a fee for service provision while transmitting the completion message to the terminal 700 (S224). However, as shown in FIG. 17, the estimated time and course may be set in the reservation process, so the payment may be made in a pre-paid method in the reservation process.

After payment of the fee (S225), the first terminal 710 may transmit the payment information to the server 800 (S226). The server 800 may check the payment information and transmit a request to open the closed door of the clothing management device 500 to the vehicle 600 (S227). The vehicle 600 may transmit the door opening request to the vehicle clothing management device 500 (S227), and the vehicle clothing management device 500 may open the door (S228).

However, although FIG. 21 describes the vehicle 600 and the vehicle clothing management device 500 in a separate manner, the vehicle clothing management device 500 may directly communicate with the server 800 in some cases. In this case, the vehicle 600 may be replaced by the vehicle clothing management device 500.

Figure 22:
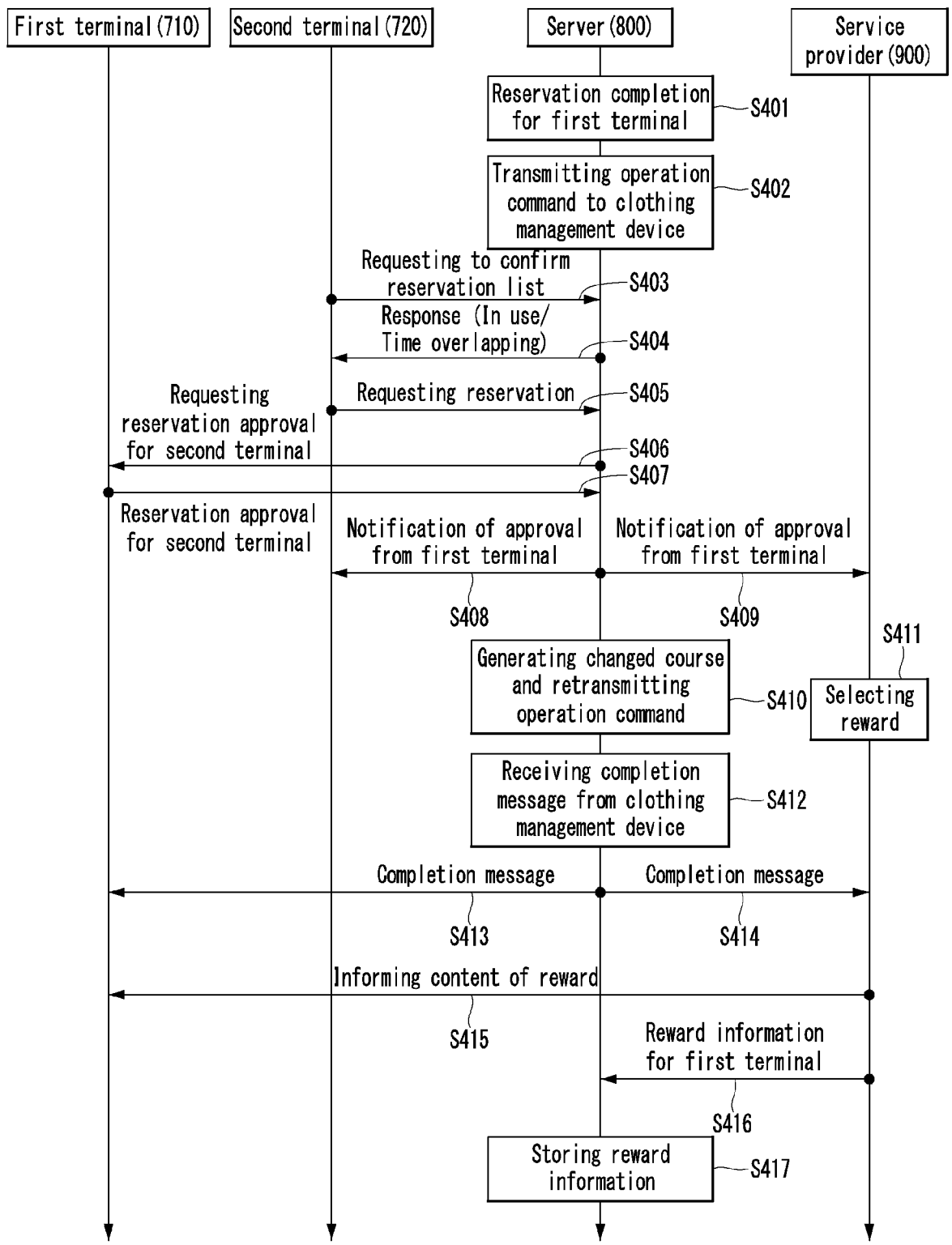
FIG. 22 is a diagram illustrating an example of a reservation method through a plurality of terminals according to a second embodiment of the present disclosure.

FIG. 22 is a diagram illustrating an example of a reservation method through a plurality of terminals according to a second embodiment of the present disclosure. However, among the examples of FIG. 22, contents identical or overlapping with those described in FIGS. 20 and 21 may be omitted.

FIG. 22 may indicate a case in which reservation times for the first terminal 710 and the second terminal 720 are overlapped. That is, the server 800 has completed reservation for the first terminal by receiving reservation information from the first terminal (S401). At this time, the reservation completion process is the same as or overlapped with the above, so it will be omitted.

The server 800 may transmit an operation command to the vehicle clothing management device 500 according to the completed reservation content (S402). That is, the vehicle clothing management device 500 may be in operation.

However, in some cases, step S402 may be omitted. The example according to FIG. 22 may be applied even when the reservation time received by the server 800 from the second terminal 720 partially or entirely overlaps with the reservation time of the first terminal.

The second terminal 720 may request confirmation of the reservation list from the server 800 (S403). At this time, the reservation list may mean a reservation list for which reservation for the first terminal 710 is completed.

The server 800 may transmit a response to this, and the transmitted response may include information that the vehicle clothing management device 500 is currently in use, or information that the reservation time received from the second terminal 720 overlaps with the reservation time of the first terminal 710 already reserved.

The second terminal 720 may request a reservation from the server 800 in order to use the vehicle clothing management device 500 at the overlapped time (S405). The server 800 may request a reservation approval for the second terminal from the first terminal 710 (S406). The server 800 may receive approval for the corresponding reservation from the first terminal 710 (S407).

When the server 800 receives the approval from the first terminal 710, the server 800 may transmit a notification of the approval to the second terminal 720 and a service provider 900 (S408, S409). Based on the approval received from the first terminal 710, the server 800 may generate a changed course and retransmit an operation command according to the changed course to the vehicle clothing management device 500 (S410).

When the operation of the vehicle clothing management device 500 is completed according to the retransmitted operation command, the server 800 may receive a completion message accordingly (S412). The server 800 may transmit a completion message that the operation of the vehicle clothing management device 500 is completed to the first terminal 710 and the service provider 900.

The service provider 900 may select a reward to be transmitted to the first terminal 710 (S411), and may transmit a message informing the content of the selected reward to the first terminal 710 (S415). In addition, the service provider 900 may transmit reward information for the first terminal 710 to the server 800 (S416).

The server 800 may store the reward information for the first terminal 710 (S417), and provide reward to the first terminal 710 when the set condition is satisfied.

At this time, the reward provided to the first terminal 710 may be a service fee discount of the first user, coupon provision, point accumulation, and the like.

Specific examples of providing rewards will be discussed.

For example, the time that the first terminal 710 sets the reservation through the server 800 may be 1 pm to 1.30 pm. At this time, the second terminal 720 may transmit reservation information to use the same clothing management device 500 of the same vehicle 600 from 1.25 pm to 1.40 pm on the same day to the server 800.

At this time, the server 800 may transmit a request to change the reservation time of the first terminal 710 from 1.00 pm to 1.25 pm to the first terminal 710. When the server 800 receives approval for the request, the server 800 may transmit a notification for the approval to the service provider 900, and the service provider 900 may provide appropriate reward to the first terminal 710. That is, when the user approves a request of the second user, appropriate rewards may be provided to the user.

As described above, in the case of reservation through a plurality of terminals 710 and 720, the course operation time of the person who reserves the service first may be changed so that a plurality of users may be provided with the clothing management service. That is, a first operation time included in the first reservation information received from the first terminal 710 may be reduced, and the service may be provided to the second terminal 720 by the reduced time. In this case, a time for providing service to the second terminal 720 may be referred to as a second operation time. It is preferable that the sum of the first operation time and the second operation time does not exceed the total driving time of the vehicle 600. In addition, when the first operation time is over, a notification that the state is currently available may be transmitted to the second terminal.

Figure 23:
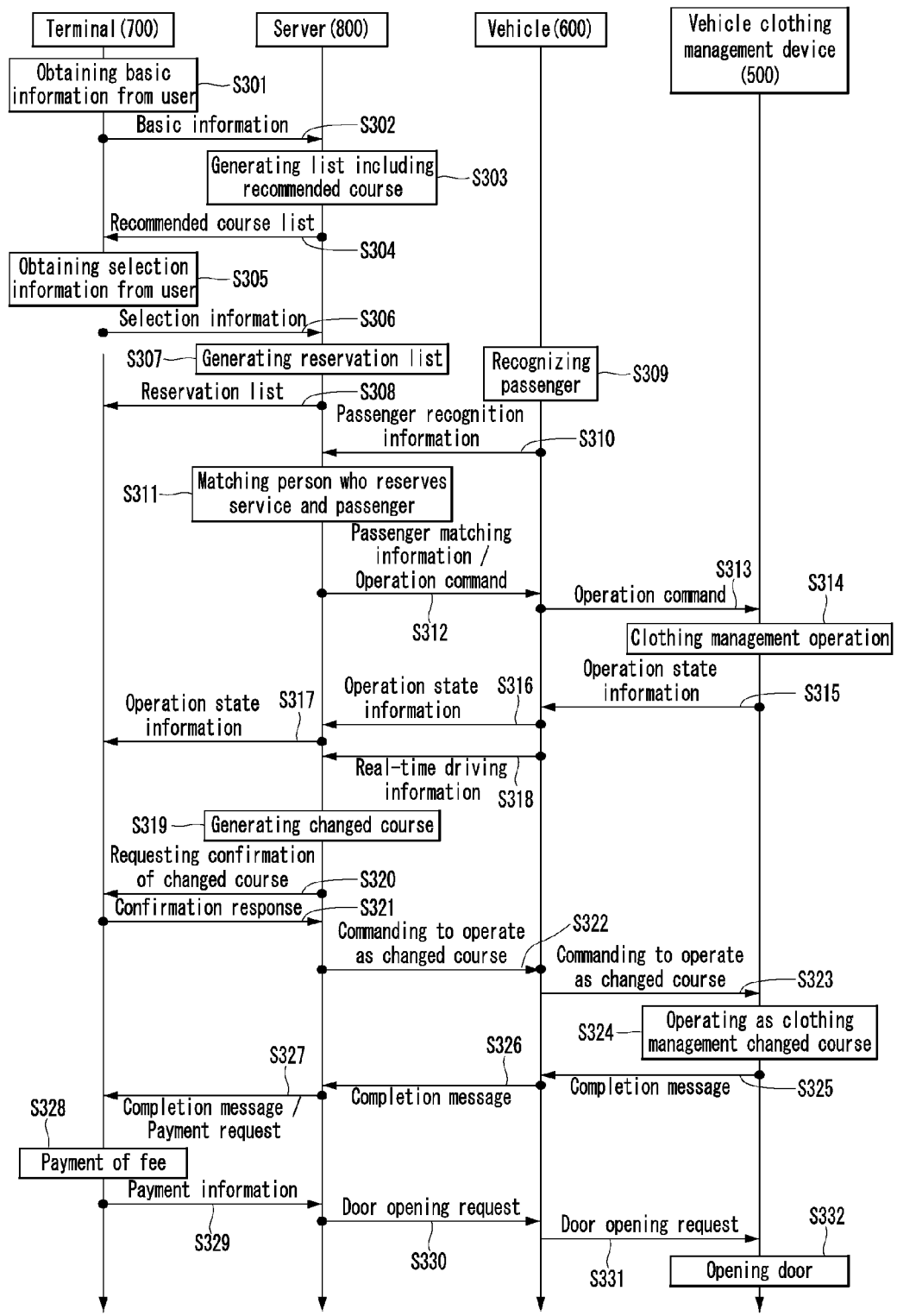
FIG. 23 is a diagram showing a specific method for providing clothing management service according to a second embodiment of the present disclosure.

FIG. 23 is a diagram showing a specific method for providing clothing management service according to a second embodiment of the present disclosure. According to FIG. 23, steps in the terminal 700, the server 800, the vehicle 600, and the vehicle clothing management device 500 are shown.

According to FIG. 23, among the steps in the terminal 700, the server 800, the vehicle 600 and the vehicle clothing management device 500, steps S301 to S317 are the same or overlapping with the steps shown in FIG. 20, and thus detailed description will be omitted.

According to FIG. 23, the vehicle 600 may transmit real-time driving information to the server 800 (S318). The real-time driving information may mean information on a driving situation, etc. that is changing in real time depending on traffic conditions of a road on which the vehicle 600 is currently driving.

For example, when an unexpected event occurs on a road in which the vehicle 600 is driving a specific route, the vehicle 600 may have a change in the time it takes to reach the destination for reasons such as driving to a destination by changing a route or waiting on the road. Such information may be referred to as real-time driving information.

According to FIG. 23, the server 800 may receive real-time driving information from the vehicle 600 (S318), generate a changed course of the vehicle clothing management device 500 according to the received real-time driving information (S319), and transmit the changed course to the terminal 700 (S320) and receive a confirmation response thereto (S321). The server 800 may command to operate as the changed course based on the received response (S322, S323), and the vehicle clothing management device 500 may operate as the changed course (S324). When the operation is completed, the vehicle clothing management device 500 may transmit a completion message to the server 800 through the vehicle 600 (S325, S326). The server 800 may transmit the completion message to the terminal 700 and request payment of a fee for the clothing management service (S327).

However, as shown in FIG. 17, etc., the estimated time and course may be set in the reservation process, so the payment may be made in a pre-paid manner in the reservation process.

The terminal 700 may transmit payment information to the server 800 after the payment of the fee (S328). The server 800 may check the payment information, and transmit a request to open a closed door of the clothing management device 500 to the vehicle 600 (S330). The vehicle 600 may transmit the door opening request to the vehicle clothing management device 500 (S331), and the vehicle clothing management device 500 may open the door (S332).

However, although FIG. 23 describes the vehicle 600 and the vehicle clothing management device 500 in a separate manner, the vehicle clothing management device 500 may directly communicate with the server 800 in some cases. In this case, the role of the vehicle 600 may be replaced by the vehicle clothing management device 500.

Figure 24:
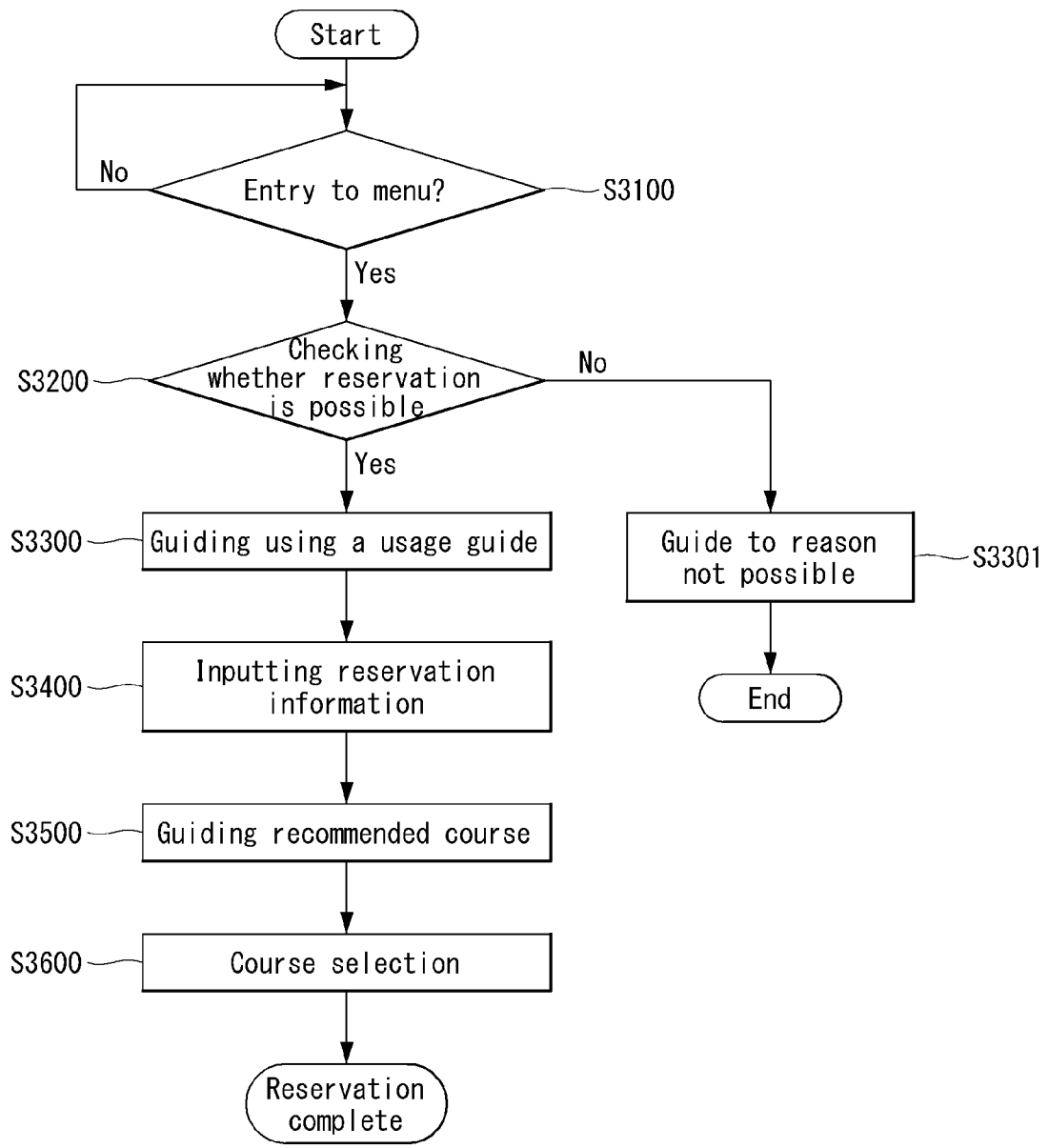
FIG. 24 is a diagram showing a reservation step according to a second embodiment of the present disclosure.
Figure 25:
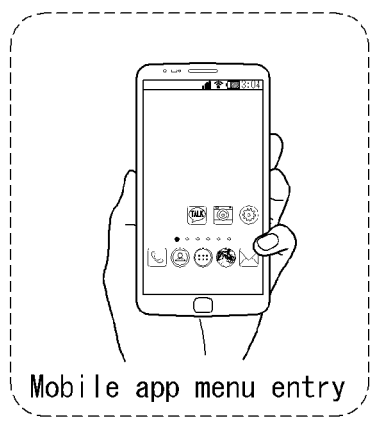
FIG. 25 is a diagram illustrating a menu entry step according to a second embodiment of the present disclosure.
Figure 25:
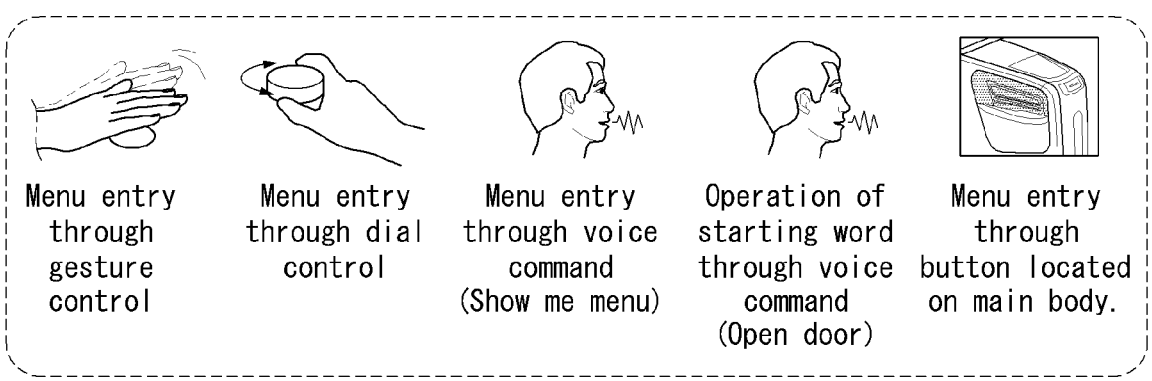

FIG. 24 is a diagram showing a reservation step according to a second embodiment of the present disclosure, and FIG. 25 is a diagram illustrating a menu entry step according to a second embodiment of the present disclosure. For reference, the same or overlapping contents as described above among the descriptions according to FIGS. 24 and 25 are omitted.

According to FIG. 24, reserving clothing management service according to the second embodiment of the present disclosure may include entering a reservation menu (S3100), checking whether the reservation is possible after entry to the reservation menu (S3200), guiding using a usage guide if the reservation is possible (S3300), inputting reservation information according to the usage guide (S3400), guiding a recommended course according to the input reservation information (S3500) and inputting course selection information among the guided recommended courses (S3600).

The entering the reservation menu (S3100) may enter the reservation menu in the terminal 700, such as a smart phone, PC, notebook, etc. that the user has. In addition, the entering the reservation menu (S3100) may enter the reservation menu through the vehicle clothing management device 500 installed in the vehicle 600.

The guiding the recommended course according to the input reservation information (S3500) may recommend not only the recommended course according to the information input by the user, but also a seat where the user sits in the vehicle 600. At this time, the recommended user's seat may be a seat adjacent to the vehicle clothing management device 500, and a seat in contact with at least one of the left or right side of the vehicle clothing management device 500.

According to FIG. 25(*a*), the reservation menu may be entered through the mobile terminal 700 such as a smart-phone, etc. In addition, according to FIG. 25 (*b*), the reservation menu may be entered through a controller included in the vehicle clothing management device 500, by using voice commands, or through a menu button located on the main body.

According to FIG. 25(*b*), the controller may be provided in the vehicle clothing management device 500, and may recognize a gesture control or may be a dial control method. In addition, according to FIG. 25(b), it may be a method of inputting voice commands through the microphone included in the vehicle 600 or the vehicle clothing management device 500.

According to FIG. 24, if the menu entry fails in the step of entering the reservation menu (S3100), the user may go back to the beginning to enter the reservation menu.

According to FIG. 24, the checking whether the reservation is possible (S3200) may be checking whether there is a person who reserved first depending on time of use and/or clothing type or checking whether the clothing are available for clothing management. If there is another person who reserved at the time, or if the clothing cannot be managed, reservations may not be processed. In this case, the server 800 may be terminated after guiding the user through a guide to reason not possible (S3301).

In addition, the guiding using the usage guide (S3300) may include contents about what information the user inputs and what clothing management service can be provided or a fee, etc. when using the service.

In addition, in the inputting course selection information (S3600), selection information set by a user among recommended courses may be input. In addition, selection information set by the user among courses in addition to the recommended courses may be input. In this case, the selection information may determine a set value set by the user in consideration of the clothing condition and the arrival time to the destination. At this time, the set value may include operating time, vibration intensity, temperature, and the like.

Figure 26:
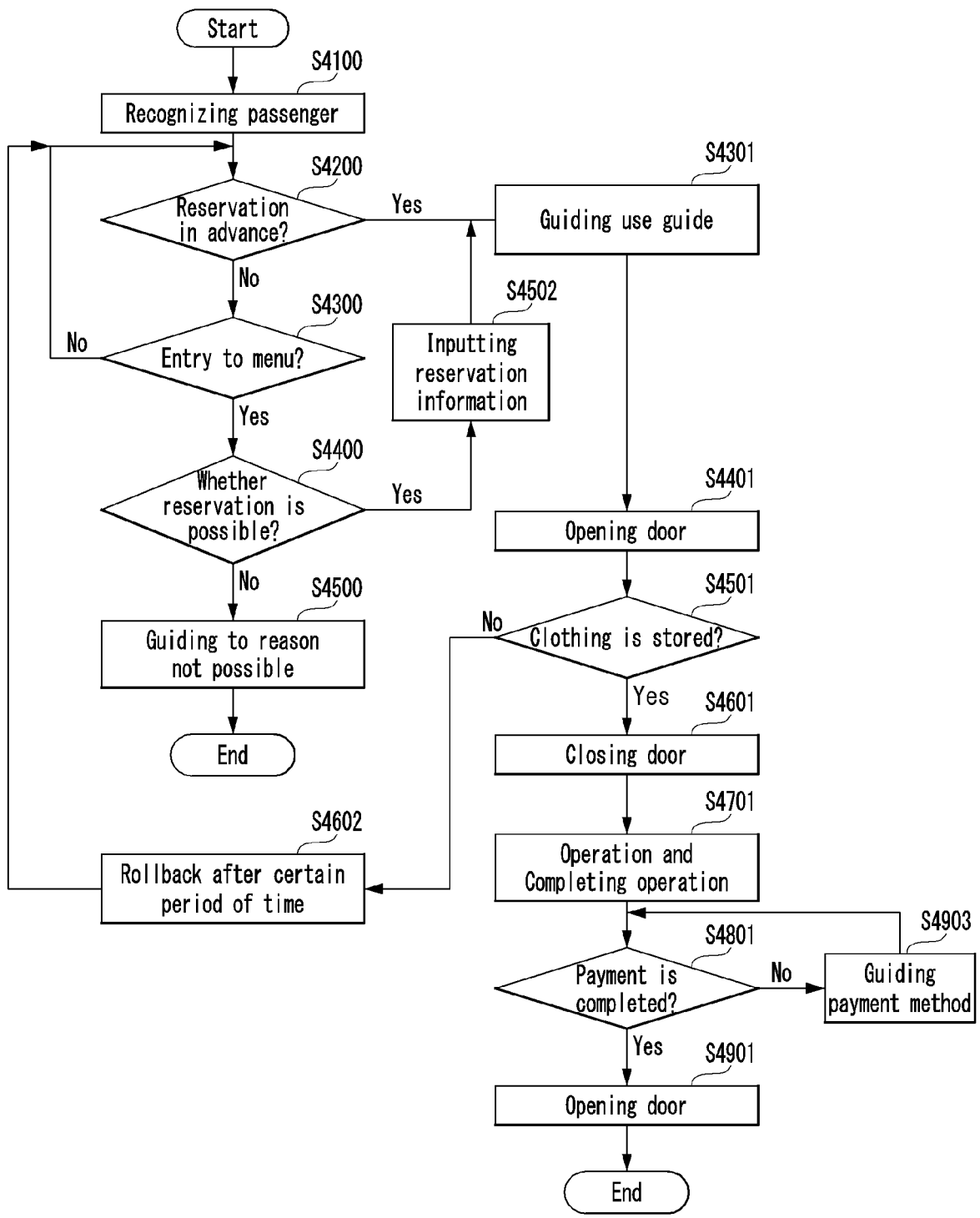
FIG. 26 is a view showing a control method of a clothing management device according to a second embodiment of the present disclosure.

FIG. 26 is a view showing a control method of a clothing management device according to a second embodiment of the present disclosure. For reference, among the descriptions according to FIG. 26, the same or overlapping contents as described above are omitted.

According to FIG. 26, it may include recognizing the passenger in the vehicle 600 or the vehicle clothing management device 500 (S4100), confirming whether the passenger is a person who has made a reservation in advance (S4200), guiding the use guide if the passenger is the person who has made a reservation as a result of the confirmation (S4301), opening the door of the vehicle clothing management device 500 (S4401), checking whether the clothing is stored in the vehicle clothing management device 500 (S4501), closing the door when the clothing storage is confirmed (S4601), operation and completing the operation (S4701), thereafter, checking whether payment is completed (S4801) and opening the door when the payment is confirmed (S4901).

In addition, according to FIG. 26, the control method of the clothing management device 500 may include after the confirming whether the passenger is the person who has made the reservation in advance (S4200), confirming entry to the reservation menu if the passenger is not the person who has made the reservation as a result of the confirmation (S4300), checking whether the reservation is possible (S4400) and ending the operation after guiding the reason not possible if the reservation is not possible (S4500).

At this time, the control method of the clothing management device 500 may include after confirming the availability state, if the reservation is available, receiving reservation information from the passenger (S4502), and guiding the use guide according to the reservation information (S4301).

In addition, the control method of the clothing management device 500 may include confirming whether the payment is complete (S4801) after the operation and the completing the operation (S4701) and guiding the payment method if the payment is not confirmed (S4903)

Operation Method of Vehicle Providing Clothing Management Service Using Vehicle Clothing Management Device Hereinafter, an operation method of a vehicle providing clothing management service using the vehicle clothing management device according to a preferred third embodiment of the present disclosure based on the above-mentioned contents will be described in detail as follows.

Hereinafter, among the detailed description of the operation method of the vehicle for providing clothing management service according to the preferred third embodiment of the present disclosure, the contents identical or overlapping with the above-described first and second embodiments will be omitted and the description will be focused on the differences.

Figure 27:
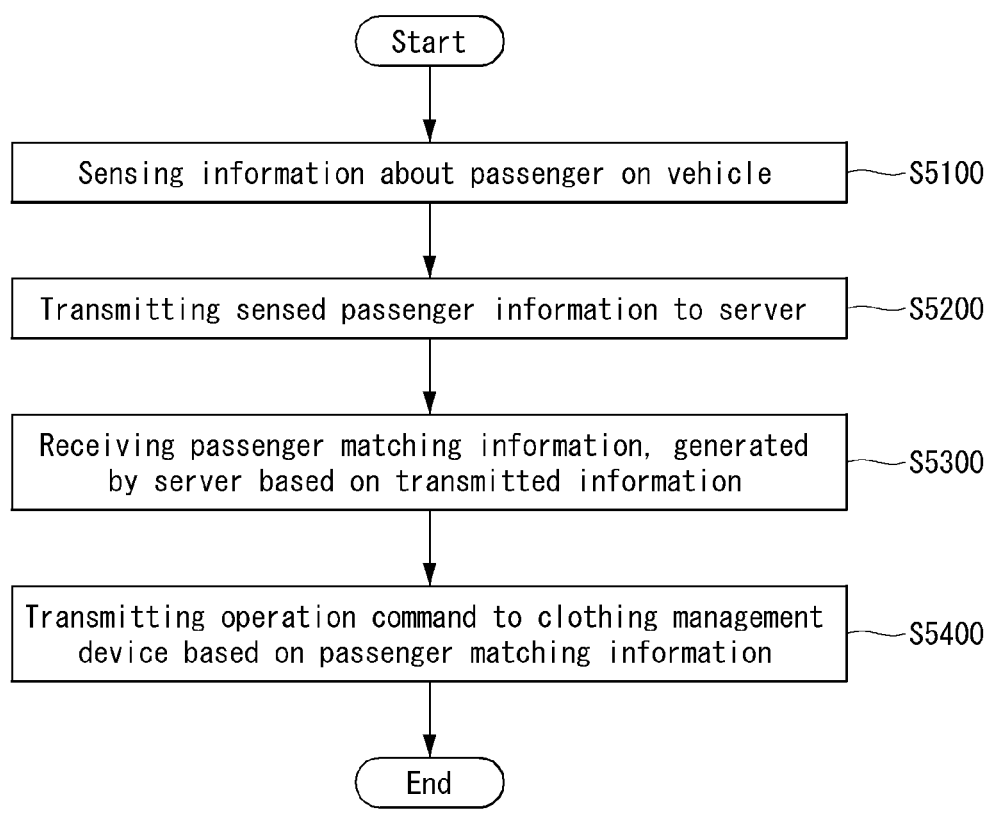
FIG. 27 is a view showing an operation method of a vehicle providing clothing management service according to a third embodiment of the present disclosure.

According to FIG. 27, an operation method of a vehicle providing clothing management service using a vehicle clothing management device may include sensing information about the passenger on the vehicle 600 (S5100), transmitting the sensed passenger information to the server 800 (S5200), receiving the passenger matching information, generated by the server 800 based on the transmitted information (S5300), and transmitting an operation command to the clothing management device 500 installed in the vehicle 600 based on the received passenger matching information (S5400).

The passenger information may be at least one of appearance information of the passenger, voice information of the passenger, and fingerprint information of the passenger, and the method of using these is the same as or overlapping with the above-described details, so detailed description thereof will be omitted.

In addition, the operation method of the vehicle 600 for providing clothing management service using the vehicle clothing management device 500 may further include receiving a door opening request from the server 800, and opening the door of the clothing management device 500 according to the received door opening request.

At this time, the door opening request may be received from the server 800 based on the fee payment information according to the completion of the operation for the clothing management device 500.

In addition, the operation method of the vehicle 600 for providing clothing management service using the vehicle clothing management device 500 may further include sensing real-time driving information of the vehicle 600 and transmitting the real-time driving information to the server 800.

In addition, the operation method of the vehicle 600 for providing clothing management service using the vehicle clothing management device 500 may further include receiving a changed course according to the real-time driving information from the server 800, and transmitting a changed operation command to the clothing management device 500 according to the changed course.

In addition, the operation method of the vehicle for providing the clothing management service according to the third embodiment of the present disclosure will be described in detail based on FIGS. 20, 21, and 23.

According to FIG. 20, the vehicle 600 may recognize the passenger who has boarded the vehicle 600 (S109). That is, the vehicle 600 may obtain the passenger recognition information. The method of obtaining the passenger recognition information is the same as or overlapping with that described in FIG. 19, and thus is omitted.

The vehicle 600 may transmit the passenger recognition information to the server 800. The vehicle 600 may receive an operation command including passenger matching information and selected course information from the server 800 (S112).

The vehicle 600 may transmit the operation command including the selected course information to the vehicle clothing management device 500 (S113). When the vehicle clothing management device 500 operates through the command, the vehicle 600 may receive operation state information accordingly from the vehicle clothing management device 500 (S115).

The operation state information may include a current operation state of the vehicle clothing management device 500. That is, the operation state information may include elapsed time operating in the set course, time remaining to complete the set course, temperature inside the device, intensity of vibration, a type of fragrance provided, humidity inside the device, etc. The vehicle 600 may transmit the received operation state information to the server 800.

At this time, the vehicle 600 may display the received operation state information on the display 650 of FIG. 13. Therefore, the vehicle 600 may transmit the operating state of the vehicle clothing management device 500 to the passenger in real time.

The vehicle 600 may receive a completion message indicating that the clothing management operation according to the set course is completed from the vehicle clothing management device 500 (S118).

In addition, the vehicle 600 may receive a door opening request of the server 800 according to payment information (S123). The vehicle 600 may transmit the door opening request to the vehicle clothing management device 500 (S124).

The operation method of the vehicle 600 of FIG. 21 is the same as or overlapping with the operation method of the vehicle 600 of FIG. 20, and thus is omitted.

According to FIG. 23, the vehicle 600 may transmit real-time driving information to the server 800 (S318). The real-time driving information may mean information on a driving situation, etc. that is changing in real time depending on traffic conditions of a road on which the vehicle 600 is currently driving.

That is, the vehicle 600 may mean a vehicle in autonomous driving as a shared vehicle, and sense a surrounding situation of the vehicle 600 during the autonomous driving. The vehicle 600 may sense current speed, acceleration, driving direction, road surface condition, shaking caused by driving, noise, and the like. Such sensed information may also be included in real-time driving information.

According to FIG. 23, the vehicle 600 may receive a changed course according to the real-time driving information (S322). That is, an operation command for the vehicle clothing management device 500 may be received from the server 800 and transmitted to the vehicle clothing management device 500.

Overview of Device for Providing Vehicle Clothing Management Service

Hereinafter, overview of device for providing vehicle clothing management service according to a preferred fourth embodiment of the present disclosure based on the above-mentioned contents will be described in detail as follows.

Hereinafter, among detailed descriptions of a server for providing vehicle clothing management service according to the preferred fourth embodiment of the present disclosure, the contents identical or overlapping with the above-described first to third embodiments will be omitted and the description will be focused on the differences.

Figure 28:
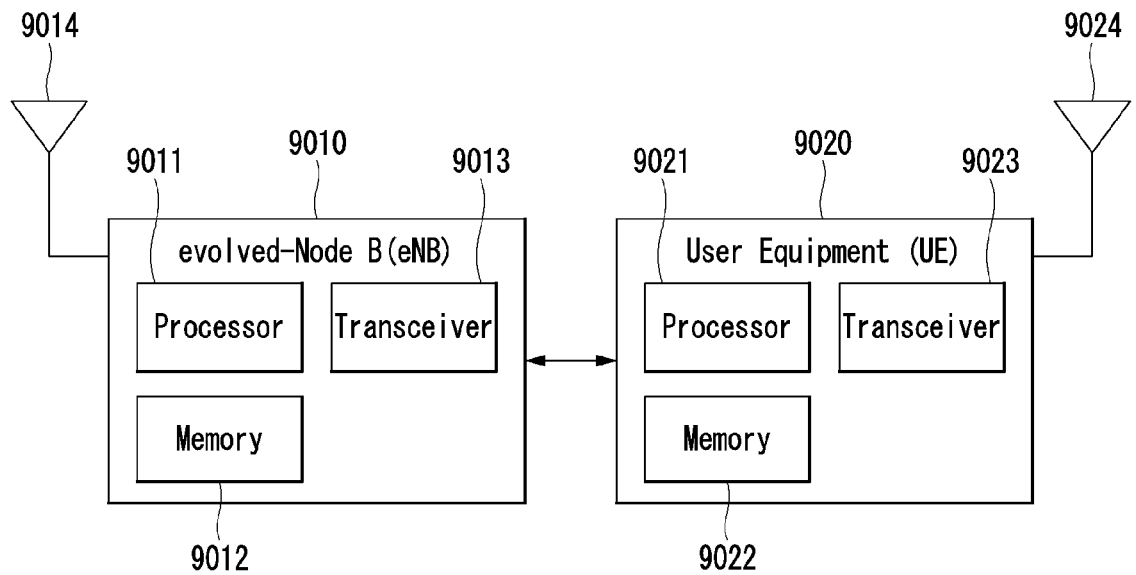
FIG. 28 is a diagram showing a general device according to a fourth embodiment of the present disclosure.

FIG. 28 is a diagram showing a general device according to a fourth embodiment of the present disclosure.

Referring to FIG. 28, a wireless communication system may include a first device 9010 and a second device 9020.

The first device 9010 may be a base station, a network node, a transmission terminal, a receiving terminal, a wireless device, a wireless communication device, a vehicle, a vehicle equipped with autonomous driving function, a connected car, a drone (unmanned aerial vehicle, UAV), an artificial intelligence (AI) module, a robot, an augmented reality (AR) device, a virtual reality (VR) device, a mixed reality (MR) device, a hologram device, a public safety device, an MTC device, an IoT device, a medical device, a fintech device (or financial device), a security device, a climate/environmental device, a device related to 5G service or another device related to the fourth industrial revolution.

The second device 9020 may be a base station, a network node, a transmission terminal, a receiving terminal, a wireless device, a wireless communication device, a vehicle, a vehicle equipped with autonomous driving function, a connected car, a drone (unmanned aerial vehicle, UAV), an artificial intelligence (AI) module, a robot, an augmented reality (AR) device, a virtual reality (VR) device, a mixed reality (MR) device, a hologram device, a public safety device, an MTC device, an IoT device, a medical device, a fintech device (or financial device), a security device, a climate/environmental device, a device related to 5G service or another device related to the fourth industrial revolution.

For example, the terminal may include a cellphone, a smart phone, a laptop computer, a digital broadcasting terminal, a personal digital assistants (PDA), a portable multimedia player (PMP), a navigation, a slate PC, a tablet PC, a ultrabook, a wearable device (e.g. smartwatch), a glass type terminal (smart glass), a head mounted display (HMD), or the like. For example, the HMD may be a display device worn on the head. For example, the HMD may be used to implement VR, AR or MR.

For example, the drone may be a flight vehicle that a human does not ride and is flying by a radio control signal. For example, the VR device may include a device that implements an object or background of a virtual world. For example, the AR device may include a device that is implemented by connecting an object or background of the virtual world to an object or background of the real world. For example, the MR device may include a device that is implemented by fusing an object or background in the virtual world to an object or background in the real world. For example, the hologram device may include a device that implements a 360 degree stereoscopic image by recording and reproducing stereoscopic information by utilizing the interference phenomenon of light generated by two laser lights called holography. For example, the public safety device may include a video relay device or a video device worn on a user's body. For example, the MTC device and the IoT device may be devices that do not require direct human intervention or manipulation. For example, the MTC device and the IoT device may include a smart meter, a bending machine, a thermometer, a smart light bulb, a door lock, or various sensors, etc. For example, the medical device may be a device used for the purpose of diagnosing, curing, alleviating, treating or preventing diseases. For example, the medical device may be a device used for the purpose of diagnosing, curing, alleviating, or correcting an injury or disorder. For example, the medical device may be a device used for the purpose of examining, replacing, or modifying a structure or function. For example, the medical device may be a device used for controlling pregnancy. For example, the medical device may include a medical device, a surgical device, a (in vitro) diagnostic device, a hearing aid, or a surgical device. For example, the security device may be a device installed in order to prevent a risk that may occur and to maintain safety. For example, the security device may be a camera, a CCTV, a recorder or a black box, etc. For example, the fintech device may be a device capable of providing financial services such as mobile payment. For example, the fintech device may include a payment device or a point of sales (POS). For example, a climate/environmental device may include a device that monitors or predicts the climate/environment.

The first device 9010 may include at least one processor, such as a processor 9011, at least one memory, such as a memory 9012, and at least one transceiver, such as a transceiver 9013. The processor 9011 may perform the functions, procedures, and/or methods described above. The processor 9011 may perform one or more protocols. For example, the processor 9011 may perform one or more layers of a wireless interface protocol. The memory 9012 may be connected to the processor 9011 and may store various types of information and/or commands. The transceiver 9013 may be connected to the processor 9011 and may be controlled to transmit and receive wireless signals.

The second device 9020 may include at least one processor, such as a processor 9021, at least one memory device, such as a memory 9022, and at least one transceiver, such as a transceiver 9023. The processor 9021 may perform the functions, procedures, and/or methods described above. The processor 9021 may perform one or more protocols. For example, the processor 9021 may perform one or more layers of a wireless interface protocol. The memory 9022 may be connected to the processor 9021 and may store various types of information and/or commands. The transceiver 9023 may be connected to the processor 9021 and may be controlled to transmit and receive wireless signals.

The memory 9012 and/or the memory 9022 may be connected inside or outside the processor 9011 and/or the processor 9021, respectively, and may be connected to other processors through various technologies, such as a wired or wireless connection.

The first device 9010 and/or the second device 9020 may have one or more antennas. For example, antenna 9014 and/or antenna 9024 may be configured to transmit and receive wireless signals.

(1) Server for Providing Vehicle Clothing Management Service

The server 800 for providing vehicle clothing management service may communicate with the vehicle 600 equipped with the vehicle clothing management device 500, as well as with the vehicle clothing management device 500 equipped with a communication module. Accordingly, all operations performed between the server 800 and the vehicle 600 in the above-described first and second embodiments may be performed between the server 800 and the vehicle clothing management device 500.

The first device 9010 of the device of FIG. 28 may be the server 800, and the second device 9020 of the device of FIG. 28 may be the vehicle 600 or the vehicle clothing management device 500 including a communication function. Conversely, the first device 9010 may be the vehicle 600 or the vehicle clothing management device 500 including the communication function, and the second device 9020 may be the server 800.

Hereinafter, the server 800 to which the present disclosure may be applied is described as the first device 9010 in FIG. 28, but the scope of the present disclosure is not limited thereto.

The server 9010 to which the present disclosure may be applied may include the transceiver 9013, the memory 9012, the processor 9013 controlling the transceiver 9013 and the memory 9012.

In the case of the transceiver 9013, transmission and reception of information with a base station or a vehicle including a communication function is performed through the antenna 9014. The transceiver 9013 using wireless communication includes a wireless communication module having a modulator, a demodulator, and a signal processor.

The wireless communication refers to communication using communication facilities previously installed by communication companies and using a wireless communication network using a frequency of the communication facilities. In this case, it may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc., as well as 3rd generation partnership project (3GPP) long term evolution (LTE). In addition, 5G communication, which is currently commercialized, may be mainly used, and 6G, which is scheduled for commercialization in the future, may also be used. However, the present disclosure may utilize a pre-installed communication network without being limited to such a wireless communication method.

The processor 9011 is configured to perform operations and control other devices. Mainly, it may mean a central processing unit (CPU), an application processor (AP), a graphics processing unit (GPU), or the like. In addition, the CPU, AP, or GPU may include one or more cores therein, and the CPU, AP or GPU may operate using operating voltages and clock signals. However, the CPU or AP may consist of several cores optimized for serial processing, while the GPU may consist of thousands of smaller, more efficient cores designed for parallel processing.

The memory 9012 may include a hard disk drive (HDD), a solid state disk (SSD), a silicon disk drive (SDD), ROM, RAM, and the like, but is not limited to these examples.

The transceiver 9013 of the server 9010 according to one preferred embodiment of the present disclosure may receive reservation information for providing clothing management service according to the present disclosure from the user terminal 700, transmit a first operation command according to the received reservation information to the shared vehicle 600, and receive a completion message from the shared vehicle 600.

In addition, the transceiver 9013 may receive basic information for providing the service from the user terminal 700, transmit the recommended course generated based on the received basic information to the user terminal 700, and receive selection information for selecting the generated recommended course from the user terminal 700.

In addition, after receiving the completion message from the vehicle 600, the transceiver 9013 may transmit a payment request to the user terminal 700, and receive payment information from the user terminal 700.

At this time, the processor 9011 of the server 9010 according to one preferred embodiment of the present disclosure may generate the first operation command according to the reservation information. In addition, the processor 9011 may generate a recommended course based on the basic information.

At this time, the basic information may include the destination of the shared vehicle 600, and the recommended course may be generated based on the estimated time to arrive at the destination of the shared vehicle 600.

In addition, the basic information may include the identity information of the person who reserved the service, the transceiver 9013 may receive passenger recognition information from the shared vehicle 600, and transmit matching information that matches the passenger with the person who reserved the service to the shared vehicle 600, the processor 9011 may generate matching information that matches the passenger with the person who reserved the service.

At this time, the passenger recognition information may include identification information of the passenger, and the matching information may include information that is the same person as a result of matching the identification information of the passenger with the identification information of the person who reserved the service.

In addition, the memory 9012 may store transmitted/received basic information, selection information, reservation information, passenger recognition information, identification information of the passenger and the person who reserved the service, matching information, and generated recommendation courses. At this time, the identification information may include face information, voice information, fingerprint information, and the like.

In addition, the transceiver 9013 may receive real-time driving information from the vehicle 600, and the processor 9011 may generate a changed recommended course based on the received real-time driving information. The transceiver 9013 may transmit the changed recommended course to the user terminal 700, and receive the changed recommended course confirmation from the user terminal 700. The transceiver 9013 may transmit an operation command to the vehicle 600 according to the changed recommended course which is confirmed.

In addition, the transceiver 9013 may communicate with a plurality of user terminals 700, and the processor 9011 may generate a reservation list and set a reservation ranking according to the order of the basic information received from the plurality of terminals 710 and 720. At this time, the transceiver 9013 may transmit the set reservation ranking to each terminal 700.

Above, although the server according to an embodiment of the present disclosure has been described, even though it is not described in the above description, parts that can be clearly understood by those skilled in the art from the above-described first and second embodiments will be included in the above description.

Hereinafter, examples of the server applied in the present disclosure are as follows.

In the server for providing clothing management service using the clothing management device provided in the shared vehicle, the server according to the fourth embodiment of the present disclosure may include the transceiver, the memory, and the processor that controls the transceiver and the memory. Based on this, the examples below are reviewed.

First Example: the transceiver may receive reservation information for providing the service from the terminal, transmit a first operation command according to the reservation information to the shared vehicle, and receive a completion message from the shared vehicle. In addition, the processor may generate the first operation command according to the reservation information.

Second Example: in the first example, the transceiver may receive basic information for providing the service from the terminal, transmit a recommended course generated based on the basic information to the terminal, and receive selection information for selecting the recommended course from the terminal. In addition, the processor may generate the recommended course based on the basic information.

Third Example: in the second example, the basic information may include a destination of the shared vehicle, and the recommended course may be generated based on an estimated time to arrive at the destination of the shared vehicle.

Example 4: in the second example, the basic information may include identification information of a person who has reserved the service, and the transceiver may receive passenger recognition information from the shared vehicle and transmit matching information for matching the passenger with the person who has reserved the service to the shared vehicle.

Example 5: in the fourth example, the passenger recognition information may include identification information of the passenger, and the matching information may include information that is the same person as a result of matching the identification information of the passenger with the identification information of the person who has reserved the service.

(2) Vehicle that Provides Clothing Management Service Using Clothing Management Device The vehicle 600 for providing clothing management service using the clothing management device may be a shared vehicle 600 including an autonomous driving system. The shared vehicle service may provide vehicles to various customers, and provide various additional services in addition to the providing of the vehicle.

In addition, the vehicle 600 may include the vehicle clothing management device 500. The vehicle clothing management device 500 may be in accordance with the first embodiment described above, may be installed in the vehicle 600 including an autonomous driving system, and manage the user's clothing during the estimated time until the passenger arrives at the destination.

The vehicle 600 may communicate with the server 800 for providing vehicle clothing management service, as well as exchange signals with the vehicle clothing management device 500 installed inside the vehicle 600. Accordingly, the vehicle 600 may perform all operations performed between the server 800 and the vehicle 600 among the above-described first and second embodiments.

The first device 9010 of the device of FIG. 28 may be the server 800, and the second device 9020 of the device of FIG. 28 may be the vehicle 600 including a communication function. Conversely, the first device 9010 may be the vehicle 600 including the communication function, and the second device 9020 may be the server 800.

Hereinafter, the vehicle 600 to which the present disclosure may be applied is described as the second device 9020 in FIG. 28, but the scope of rights of the present disclosure is not limited thereto.

The vehicles 600 and 9020 to which the present disclosure may be applied may include the transceiver 9023, the memory 9022, and the processor 9021 that controls the transceiver 9023 and the memory 9022.

The transceiver 9023 performs transmission and reception of information with the base station or the vehicle including the communication function through the antenna 9024.

Above, although the vehicle according to an embodiment of the present disclosure has been described, even though it is not described in the above description, parts that can be clearly understood by those skilled in the art from the above-described first and third embodiments will be included in the above description.

The transceiver 9023 may transmit the passenger recognition information to the server 800. The transceiver 9023 may receive an operation command including passenger matching information and selected course information from the server 800.

The transceiver 9023 may transmit the operation command including selected course information to the vehicle clothing management device 500 (S113). When the vehicle clothing management device 500 operates through the command, the transceiver 9023 may receive operation state information accordingly from the vehicle clothing management device 500.

The transceiver 9023 may transmit the received operation state information to the server 800. The transceiver 9023 may receive a completion message indicating that the clothing management operation according to the set course from the vehicle clothing management device 500 is completed.

In addition, the transceiver 9023 may receive a door opening request of the server 800 according to payment information. The transceiver 9023 may transmit the door opening request to the vehicle clothing management device 500.

The transceiver 9023 may transmit real-time driving information to the server 800. The transceiver 9023 may receive a changed course according to the real-time driving information. That is, the transceiver 9023 may receive an operation command for the vehicle clothing management device 500 from the server 800 and transmit it to the vehicle clothing management device 500.

Figure 29:
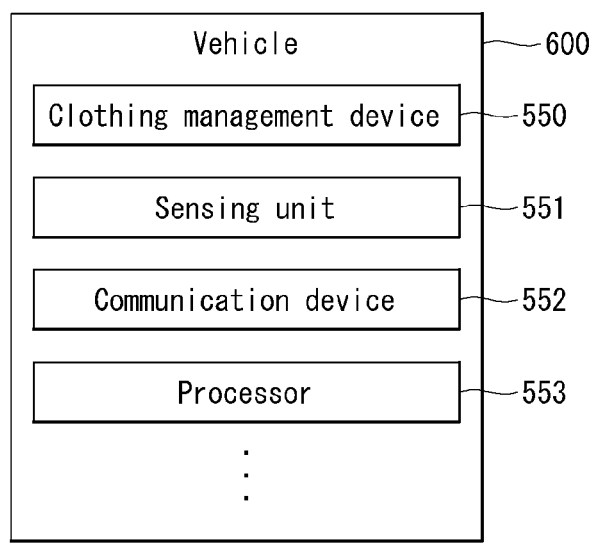
FIG. 29 is a view showing a vehicle providing clothing management service according to a fourth embodiment of the present disclosure.

According to FIG. 29, the vehicle 600 may include the clothing management device 500, a sensing unit 551, a communication device 552, and a processor 553.

The clothing management device 500 may refer to the vehicle clothing management device according to the first embodiment of the present disclosure. Therefore, the description of the clothing management device 500 is the same as or overlapping with the above description, so detailed description thereof will be omitted.

The sensing unit 551 may be installed around the clothing management device 500, it may sense the passenger. The sensing unit 551 may be at least one of a camera for recognizing an appearance of the passenger, a microphone for recognizing a voice of the passenger, and a fingerprint sensor for recognizing a fingerprint of the passenger.

The method of recognizing the appearance, voice, and fingerprint of the passenger is the same as or overlapping with the above description, so detailed descriptions thereof are omitted.

In addition, the sensing unit 551 may sense the real-time driving information of the vehicle 600.

The communication device 552 may be configured to transmit the sensed passenger recognition information to the server. The communication device 552 may receive at least one of passenger matching information, an operation command for the clothing management device 500, a door opening request of the clothing management device 500, and a changed course according to the real-time driving information from the server.

At this time, the door opening request may be received from the server based on the fee payment information according to the completion of the operation for the clothing management device 500.

The processor 5523 may open the door of the clothing management device 500 according to the received door opening request. That is, the processor 5523 may generate a command to open the door of the clothing management device 500.

The processor 5523 may control the operation of the clothing management device 500 according to the changed course. That is, the processor 5523 may generate a first operation command including the operation course, and then generate a second operation command according to the changed course. The processor 5523 may control the operation of the clothing management device 500 through these operation commands.

In addition, the processor 5523 may control the operation of the clothing management device 500 through the operation command received from the server.

What is claimed is:

1. A method for controlling a vehicle that has a cleaning device, comprising:
   receiving, from a terminal, reservation information for a cleaning operation performed by the cleaning device located in the vehicle;
   transmitting, based on the received reservation information, one or more first operation commands that control the vehicle to move to a location associated with the received reservation information and enables the cleaning device located in the vehicle to perform the cleaning operation;
   receiving, from the vehicle and based on completion of the cleaning operation performed by the cleaning device located in the vehicle, a completion message; and
   handling control of the vehicle and the cleaning device located in the vehicle based on the received completion message.

2. The method of claim 1, wherein the receiving reservation information comprises:
   receiving basic information from the terminal to the vehicle;
   transmitting a recommended cleaning course generated by the cleaning device located in the vehicle and based on the basic information; and
   selecting the recommend cleaning course from the terminal, and
   receiving the selection information from the terminal to the cleaning device located in the vehicle.

3. The method of claim 2, wherein the basic information includes a destination of a user.

4. The method of claim 3, wherein the recommended cleaning course is generated based on an estimated time to reach the destination of the user.

5. The method of claim 2, wherein the basic information includes identification information of a user who reserves the cleaning device located in the vehicle.

6. The method of claim 5, further includes:
   receiving, from a terminal, passenger recognition information from the vehicle; and
   transmitting, based on the received passenger recognition information, matching information of a passenger and the user who reserves the cleaning device, to the vehicle.

7. The method of claim 6, wherein the passenger recognition information includes identification information of the passenger, and
wherein the matching information includes a result of matching the identification information of the passenger to the identification information of the user that reserves the cleaning device in the vehicle.

8. The method of claim 6, wherein the passenger recognition information includes at least one of image data of the passenger obtained by a camera located in the vehicle, voice data of the passenger obtained by a microphone located in the vehicle, or fingerprint data of the passenger obtained by a fingerprint sensor located in the vehicle.

9. The method of claim 2, wherein receiving the basic information comprises:
transmitting, to the terminal, recommendation time information for controlling the cleaning device in the vehicle, and
receiving the basic information generated based on the transmitted recommendation time information.

10. The method of claim 9, wherein the recommendation time information is generated based on a remaining time after one or more reserved time included in previously received reservation information.

11. The method of claim 2, wherein receiving the basic information comprises:
receiving a first basic information for controlling the cleaning device from a first terminal, and
receiving a second basic information for controlling the cleaning device from a second terminal.

12. The method of claim 11, wherein transmitting the recommended cleaning course comprises:
generating a priority of the first terminal and the second terminal according to a first time at which the first basic information is received and a second time at which the second basic information is received,
transmitting, based on the generated priority, a first recommended cleaning course for the first terminal and a second recommended cleaning course for the second terminal, and
receiving, from the first terminal and the second terminal and based on selecting of the first recommended cleaning course and selecting of the second recommended cleaning course, first selection information and second selection information.

13. The method of claim 1, further comprises:
requesting, based on the completion message, a cleaning device operation fee from the vehicle; and
receiving, from the terminal, payment information according to the requested cleaning device operation fee.

14. The method of claim 13, further comprises requesting, from the terminal and based on the payment information, to open the cleaning device of the vehicle.

15. The method of claim 1, further comprises:
receiving operation state information according to the one or more first operation commands, and real-time driving information of the vehicle; and
transmitting, based on the operation state information and the real-time driving information, one or more second operation commands to the cleaning device in the vehicle.

16. A vehicle, comprising:
a cleaning device located in the vehicle;
a sensing unit located at the cleaning device and configured for sensing a passenger;
a communication device configured to transmit passenger recognition information from the vehicle to a server; and
a processor configured to control the cleaning device, the sensing unit, and the communication device.

17. The vehicle of claim 16, wherein the sensing unit comprises at least one of a camera configured to obtain image data of the passenger, a microphone configured to obtain a voice of the passenger, or a fingerprint sensor configured to obtain a fingerprint of the passenger.

18. The vehicle of claim 16, wherein the communication device is configured to receive, from the server, passenger matching information and one or more operation commands to control the cleaning device.

19. The vehicle of claim 18, wherein the communication device is configured to receive a door opening request from the server, and
wherein the processor is configured to open, based on the received door opening request, a door of the cleaning device.

20. The vehicle of claim 19, wherein the door opening request is received based on fee payment information and from the server.

21. The vehicle of claim 16, wherein the sensing unit is configured to sense real-time driving information of the vehicle, and
wherein the communication device is configured to transmit the real-time driving information of the vehicle to the server.

22. The vehicle of claim 21, wherein the communication device is configured to receive a changed cleaning course according to the real-time driving information of the vehicle from the server, and
wherein the processor is configured to control, based on the changed cleaning course, the cleaning device of the vehicle.

23. A method for controlling a vehicle that has a cleaning device, comprising:
sensing information about a passenger in the vehicle;
transmitting the sensed passenger information to a server;
receiving passenger matching information that is generated by the server and based on the transmitted passenger information; and
transmitting, based on the received passenger matching information, one or more operation commands to control the cleaning device in the vehicle.

24. The method of claim 23, wherein the passenger information comprises at least one of appearance information of the passenger, voice information of the passenger, or fingerprint information of the passenger.

25. The method of claim 23, further comprises:
receiving a door opening request from the server; and
opening, based on the received door opening request, a door of the cleaning device in the vehicle.

26. The method of claim 25, wherein the door opening request is received from the server and based on fee payment information.

27. The method of claim 23, further comprises:
sensing real-time driving information of the vehicle; and
transmitting the real-time driving information of the vehicle to the server.

28. The method of claim 27, further comprises:
receiving a changed cleaning course according to the real-time driving information of the vehicle from the server; and
transmitting, based on the changed cleaning course, a changed operation command to the cleaning device in the vehicle.

* * * * *